(12) United States Patent
Li

(10) Patent No.: US 12,490,238 B2
(45) Date of Patent: Dec. 2, 2025

(54) DATA TRANSMISSION METHOD AND APPARATUS

(71) Applicant: Huawei Technologies Co., Ltd., Shenzhen (CN)

(72) Inventor: Bingzhao Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 244 days.

(21) Appl. No.: 18/351,950

(22) Filed: Jul. 13, 2023

(65) Prior Publication Data
US 2023/0362886 A1 Nov. 9, 2023

Related U.S. Application Data

(63) Continuation of application No. PCT/CN2021/110130, filed on Aug. 2, 2021.

(30) Foreign Application Priority Data

Jan. 14, 2021 (WO) ................ PCT/CN2021/071902

(51) Int. Cl.
*H04W 76/28* (2018.01)
*H04W 4/06* (2009.01)
*H04W 68/02* (2009.01)

(52) U.S. Cl.
CPC ............. *H04W 68/02* (2013.01); *H04W 4/06* (2013.01); *H04W 76/28* (2018.02)

(58) Field of Classification Search
None
See application file for complete search history.

(56) References Cited

U.S. PATENT DOCUMENTS

| 2004/0029596 A1 | 2/2004 | Kim et al. |
| 2013/0136072 A1 | 5/2013 | Bachmann et al. |
| 2014/0362756 A1 | 12/2014 | Maeda et al. |

(Continued)

FOREIGN PATENT DOCUMENTS

| CN | 1438807 A | 8/2003 |
| CN | 102056090 A | 5/2011 |

(Continued)

OTHER PUBLICATIONS

3GPP TSG-SA4 Meeting #107 S4-200325: "Support of HLS and hybrid DASH/HLS service over eMBMS", ENENSYS, Apple, Qualcomm Incorporated, Ericson LM, Jan. 20-24, 2020, total 23 pages.
3GPP TS 38.323 V16.2.0 (Sep. 2020), 3rd Generation Partnership Project;Technical Specification Group Radio Access Network;NR;Packet Data Convergence Protocol (PDCP) specification (Release 16), 40 pages.

(Continued)

*Primary Examiner* — Idowu O Osifade
(74) *Attorney, Agent, or Firm* — Slater Matsil, LLP

(57) ABSTRACT

An access network device receives first indication information sent by a terminal device, where the first indication information indicates an identifier of a data packet of a multicast service that has been received by the terminal device; the access network device determines a target data packet based on the first indication information; and the access network device sends the target data packet to the terminal device. The terminal device reports the identifier of the received data packet of the multicast service, so that the access network device may determine, based on the identifier, a data packet that is of a multicast service and that has been sent but has not been received by the terminal device.

24 Claims, 9 Drawing Sheets

(56) References Cited

U.S. PATENT DOCUMENTS

| | | | |
|---|---|---|---|
| 2015/0223030 A1 | 8/2015 | Gu et al. | |
| 2019/0357172 A1* | 11/2019 | Park | H04W 68/04 |
| 2020/0092923 A1 | 3/2020 | Abraham et al. | |
| 2020/0322777 A1 | 10/2020 | Ryu et al. | |

FOREIGN PATENT DOCUMENTS

| | | |
|---|---|---|
| CN | 109246803 A | 1/2019 |
| CN | 109392092 A | 2/2019 |
| CN | 109756846 A | 5/2019 |
| CN | 109982266 A | 7/2019 |
| CN | 110972083 A | 4/2020 |
| CN | 111586643 A | 8/2020 |
| EP | 3621363 A1 | 3/2020 |
| WO | 2017157348 A1 | 9/2017 |
| WO | 2020164527 A1 | 8/2020 |
| WO | 2020221281 A1 | 11/2020 |

OTHER PUBLICATIONS

3GPP TS 38.300 V16.4.0:"3rd Generation Partnership Project;Technical Specification Group Radio Access Network;NR; NR and NG-RAN Overall Description; Stage 2(Release 16)",Dec. 2020,total 149 pages.

3GPP TS 38.304 V16.3.0:"3rd Generation Partnership Project;Technical Specification Group Radio Access Network;NR;User Equipment (UE) procedures in Idle mode and RRC Inactive state(Release 16)",Dec. 2020,total 39 pages.

3GPP TS 38.331 V16.3.1 (Jan. 2021), 3rd Generation Partnership Project;Technical Specification Group Radio Access Network;NR;Radio Resource Control (RRC) protocol specification(Release 16), 932 pages.

3GPP TS 38.413 V16.4.0:"3rd Generation Partnership Project;Technical Specification Group Radio Access Network;NG-RAN;NG Application Protocol (NGAP)(Release 16)",Jan. 2021,total 470 pages.

* cited by examiner

//;; # DATA TRANSMISSION METHOD AND APPARATUS

CROSS-REFERENCE TO RELATED APPLICATIONS

This application is a continuation of International Application No. PCT/CN2021/110130, filed on Aug. 2, 2021, which claims priority to International Patent Application No. PCT/CN2021/071902, filed on Jan. 14, 2021. The disclosures of the aforementioned applications are hereby incorporated by reference in their entireties.

TECHNICAL FIELD

This application relates to the communication field, and in particular, to a data transmission method and apparatus.

BACKGROUND

A multimedia broadcast multicast service (MBMS) or a multicast/multicast broadcast service (MBS) is mainly applicable to services oriented to a plurality of user equipments (UE), for example, live broadcast and scheduled program playing. A multicast transmission technology is a technology in which an MBS service is simultaneously sent to the plurality of UEs through a base station. The MBS service may be sent by a network device to the UEs in a unicast mode by establishing a bearer dedicated for the UEs, or may be sent to the UEs in a multicast mode by establishing a bearer dedicated for the MBS service. When a large quantity of UEs need to receive an MBS service, bearers dedicated for the large quantity of UEs need to be established if the MBS service is sent in the unicast mode, and such a mode consumes resources; only a bearer dedicated for the MBS needs to be established if the MBS service is sent to the UEs in the multicast mode, and all UEs interested in the service may receive the MBS through the bearer. This reduces air interface resources, improves spectrum utilization, and improves transmission efficiency.

However, in the multicast broadcast service, efficiency of sending a paging indication message from a core network to a base station and then to UE is excessively low, and a paging indication message needs to be triggered for each UE in a group. In addition, a time point at which the core network/the base station starts to send data of a multicast service is indefinite. If UE accesses the network after the core network or the base station starts to send the data of the multicast service, the UE may miss data of the multicast service that has been sent before the UE accesses the network.

Therefore, how to optimize a multicast service is a problem to be resolved.

SUMMARY

This application provides a data transmission method and apparatus, to resend multicast service data that is missed because a terminal device does not access an access network device in time or the terminal device does not receive the data of the multicast service in time.

According to a first aspect, a data transmission method is provided. The method includes:

With reference to the first aspect, in some implementations of the first aspect, an access network device receives first indication information sent by a terminal device, where the first indication information indicates an identifier of a data packet that is of a multicast service and that has been received by the terminal device; the access network device determines a target data packet based on the first indication information; and the access network device sends the target data packet to the terminal device.

Based on the foregoing solution, the terminal device reports the identifier of the received data packet of the multicast service, so that the access network device may determine, based on the identifier, a data packet that is of a multicast service and that has been sent but has not been received by the terminal device, that is, the target data packet, and the access network device may resend the target data packet to the terminal device. In this way, the terminal device may receive the missed data packet of the multicast service.

With reference to the first aspect, in some implementations of the first aspect, the identifier of the data packet that is of the multicast service and that has been received by the terminal device is a sequence number of the data packet that is of the multicast service and that is received by the terminal device in a point-to-multipoint (PTM) mode.

With reference to the first aspect, in some implementations of the first aspect, a sequence number of the target data packet is less than the sequence number of the data packet that is of the multicast service and that is received by the terminal device in the PTM mode.

With reference to the first aspect, in some implementations of the first aspect, the sequence number of the data packet that is of the multicast service and that is received by the terminal device in the PTM mode is a sequence number of a first data packet that is of the multicast service and that is received by the terminal device in the PTM mode.

It should be understood that the terminal device may send, to the access network device, the sequence number of the first data packet that is of the multicast service and that is received by the terminal device in the PTM mode, a sequence number of a received data packet with a smallest sequence number, or sequence numbers of all received data packets. This is not limited in this application.

With reference to the first aspect, in some implementations of the first aspect, that the access network device sends a target data packet to the terminal device includes: The access network device sends the target data packet to the terminal device in a point-to-point (PTP) mode.

With reference to the first aspect, in some implementations of the first aspect, the access network device receives second indication information sent by a core network device, where the second indication information indicates that the terminal device needs to receive the data packet of the multicast service; the access network device generates target configuration information based on the second indication information, where the target configuration information is configuration information of the multicast service of the terminal device; and the access network device sends the target configuration information to the terminal device.

With reference to the first aspect, in some implementations of the first aspect, the configuration information of the multicast service of the terminal device includes PTM mode configuration information and PTP mode configuration information.

With reference to the first aspect, in some implementations of the first aspect, the access network device sends first request information to the core network device, where the first request information is used to request the core network device to send the second indication information.

With reference to the first aspect, in some implementations of the first aspect, the access network device sends second request information to the terminal device, where the second request information is used to request the terminal device to report the first indication information.

According to a second aspect, a data transmission method is provided. The method includes: A terminal device sends first indication information to an access network device, where the first indication information indicates an identifier of a data packet that is of a multicast service and that has been received by the terminal device; and the terminal device receives a target data packet sent by the access network device.

Based on the foregoing solution, the terminal device reports the identifier of the received data packet of the multicast service, so that the access network device may determine, based on the identifier, a data packet that is of a multicast service and that has been sent but has not been received by the terminal device, that is, the target data packet, and the access network device may resend the target data packet to the terminal device. In this way, the terminal device may receive the missed data packet of the multicast service.

With reference to the second aspect, in some implementations of the second aspect, the identifier of the data packet that is of the multicast service and that has been received by the terminal device is a sequence number of the data packet that is of the multicast service and that is received by the terminal device in a PTM mode.

With reference to the second aspect, in some implementations of the second aspect, a sequence number of the target data packet is less than the sequence number of the data packet that is of the multicast service and that is received by the terminal device in the PTM mode.

With reference to the second aspect, in some implementations of the second aspect, the sequence number of the data packet that is of the multicast service and that is received by the terminal device in the PTM mode is a sequence number of a first data packet that is of the multicast service and that is received by the terminal device in the PTM mode.

It should be understood that the terminal device may send, to the access network device, the sequence number of the first data packet that is of the multicast service and that is received by the terminal device in the PTM mode, a sequence number of a received data packet with a smallest sequence number, or sequence numbers of all received data packets. This is not limited in this application.

With reference to the second aspect, in some implementations of the second aspect, the terminal device receives the target data packet sent by the terminal device in a PTP mode.

With reference to the second aspect, in some implementations of the second aspect, the terminal device receives target configuration information sent by the access network device, where the target configuration information is configuration information of the multicast service of the terminal device.

With reference to the second aspect, in some implementations of the second aspect, the configuration information of the multicast service of the terminal device includes PTM mode configuration information and PTP mode configuration information.

With reference to the second aspect, in some implementations of the second aspect, the terminal device receives second request information sent by the access network device, where the second request information is used to request the terminal device to report the first indication information.

According to a third aspect, a data transmission method is provided. The method includes: A core network device generates first information, where the first information includes a service identifier of a multicast service and first parameter information, the first parameter information includes at least one of paging identification information, discontinuous reception cycle information, and capability information of each terminal device in a first set of terminal devices, the first set of terminal devices includes at least two terminal devices; and the core network device sends the first information to an access network device.

Based on the foregoing solution, the core network device generates the first information, where the first information includes the service identifier of the multicast service, and at least one of the paging identification information, the discontinuous reception cycle information, and the capability information of each terminal device, and then, the core network device sends the first information to the access network device. The access network device may determine a paging occasion based on the first information, so that the access network device may deliver second information at paging time. Therefore, efficiency of sending a paging indication message is improved.

With reference to the third aspect, in some implementations of the third aspect, the first information further includes second parameter information, the second parameter information includes at least one of common paging priority information and common tracking area identity list information of each terminal device in a second set of terminal devices, the second set of terminal devices includes at least two terminal devices, and the second set of terminal devices belongs to the first set of terminal devices.

Based on the foregoing solution, because the first information includes at least one of the common paging priority information and the common tracking area identity list information of each terminal device in the second set of terminal devices, that is, paging priority information or common tracking area identity list information of all terminal devices in the second set of terminal devices is the same, the access network device only needs to deliver the second information for only one time, so that each terminal device in the second set of terminal devices may receive the second information. This greatly improves the efficiency of sending the paging indication message and reduces signaling costs.

According to a fourth aspect, a data transmission method is provided. The method includes:

An access network device receives first information sent by a core network device, where the first information includes service identifier information of a multicast service and first parameter information, the first parameter information includes at least one of paging identification information, discontinuous reception cycle information, and capability information of each terminal device in a first set of terminal devices, and the first set of terminal devices includes at least two terminal devices; the access network device determines sending time of second information based on the first information, where the second information includes the service identifier information of the multicast service; and the access network device sends the second information to a first terminal device at the sending time of the second information, where the first terminal device belongs to the first set of terminal devices.

Based on the foregoing solution, the access network device receives the first information sent by the core network device, where the first information includes a service identifier of the multicast service, and at least one of the paging identification information, the discontinuous reception cycle information, and the capability information of each terminal device. The access network device may determine a paging occasion based on the first information, so that the access network device may deliver the second information at paging time. Therefore, efficiency of sending a paging indication message is improved.

With reference to the fourth aspect, in some implementations of the fourth aspect, the first information further includes a second parameter, the second parameter information includes at least one of paging priority information and tracking area identity list information of each terminal device in a second set of terminal devices, tracking area identity list information of all terminal devices in the second set of terminal devices is the same, the second set of terminal devices includes at least two terminal devices, and the second set of terminal devices belongs to the first set of terminal devices.

Based on the foregoing solution, because the first information includes at least one of common paging priority information and common tracking area identity list information of each terminal device in the second set of terminal devices, that is, paging priority information or common tracking area identity list information of all terminal devices in the second set of terminal devices is the same, the access network device only needs to centrally deliver the second information for only one time, so that each terminal device in the second set of terminal devices may receive the second information. This greatly improves the efficiency of sending the paging indication message and reduces signaling costs.

With reference to the fourth aspect, in some implementations of the fourth aspect, the second information is centrally sent by the access network device to terminal devices in the second set of terminal devices.

According to a fifth aspect, a data transmission method is provided. The method includes: A core network device determines sending time of a data packet of a multicast service based on parameter information, where the parameter information includes at least one of the following information: delay information of the multicast service of a terminal device of a multicast group, reliability information of the multicast service of the terminal device of the multicast group, discontinuous reception cycle information of the terminal device of the multicast group, and a ratio of a quantity of terminal devices that are of a multicast group and that access an access network device to a quantity of terminal devices of the multicast group; and the core network device sends the data packet of the multicast service to the access network device at the sending time.

Based on the foregoing solution, the core network device determines the sending time of the data packet of the multicast service based on the parameter information, so that efficiency of sending data of the multicast service may be improved, and flexibility of sending the data of the multicast service may be enhanced.

With reference to the fifth aspect, in some implementations of the fifth aspect, that the core network device determines sending time of a data packet of a multicast service based on delay information of the multicast service of a terminal device of a multicast group includes:

The core network device determines the sending time of the data packet of the multicast service based on a delay requirement of the multicast service of the terminal device of the multicast group.

With reference to the fifth aspect, in some implementations of the fifth aspect, that the core network device determines sending time of a data packet of a multicast service based on reliability information of the multicast service of a terminal device of a multicast group includes: The core network device determines the sending time of the data packet of the multicast service based on a reliability requirement of the multicast service of the terminal device of the multicast group.

With reference to the fifth aspect, in some implementations of the fifth aspect, that the core network device determines sending time of a data packet of a multicast service based on discontinuous reception cycle information of a terminal device of a multicast group includes: When the terminal device of the multicast group completes one discontinuous reception cycle, the core network device determines the sending time of the data packet of the multicast service.

With reference to the fifth aspect, in some implementations of the fifth aspect, that the core network device determines sending time of a data packet of the multicast service based on a ratio of a quantity of terminal devices that are of a multicast group and that access an access network device to a quantity of terminal devices of the multicast group includes: When a ratio of the quantity of terminal devices that are of the multicast group and that access the access network device to the quantity of terminal devices of the multicast group is greater than a preset threshold, the core network device determines the sending time of the data packet of the multicast service.

According to a sixth aspect, a data transmission apparatus is provided. The apparatus includes: a transceiver module, configured to receive first indication information sent by a terminal device, where the first indication information indicates an identifier of a data packet that is of a multicast service and that has been received by the terminal device; and a processing module, configured to determine a target data packet based on the first indication information. The transceiver module is further configured to send the target data packet to the terminal device.

For advantageous effects brought by the foregoing data transmission apparatus, refer to the specific description of the first aspect. For brevity, details are not described herein again.

With reference to the sixth aspect, in some implementations of the sixth aspect, the identifier of the data packet that is of the multicast service and that has been received by the terminal device is a sequence number of the data packet that is of the multicast service and that is received by the terminal device in a point-to-multipoint PTM mode.

With reference to the sixth aspect, in some implementations of the sixth aspect, a sequence number of the target data packet is less than the sequence number of the data packet that is of the multicast service and that is received by the terminal device in the PTM mode.

With reference to the sixth aspect, in some implementations of the sixth aspect, the sequence number of the data packet that is of the multicast service and that is received by the terminal device in the PTM mode is a sequence number of a first data packet that is of the multicast service and that is received by the terminal device in the PTM mode.

With reference to the sixth aspect, in some implementations of the sixth aspect, the transceiver module is specifically configured to send the target data packet to the terminal device in a point-to-point PTP mode.

With reference to the sixth aspect, in some implementations of the sixth aspect, the transceiver module is further specifically configured to receive second indication information sent by a core network device, where the second indication information indicates that the terminal device needs to receive the data packet of the multicast service. The processing module is specifically configured to generate target configuration information based on the second indication information, where the target configuration information is configuration information of the multicast service of the terminal device. The transceiver module is further specifically configured to send the target configuration information to the terminal device.

With reference to the sixth aspect, in some implementations of the sixth aspect, the configuration information of the multicast service of the terminal device includes PTM mode configuration information and PTP mode configuration information.

With reference to the sixth aspect, in some implementations of the sixth aspect, the transceiver module is further specifically configured to send first request information to the core network device, where the first request information is used to request the core network device to send the second indication information.

With reference to the sixth aspect, in some implementations of the sixth aspect, the transceiver module is further specifically configured to send second request information to the terminal device, where the second request information is used to request the terminal device to report the first indication information.

According to a seventh aspect, a data transmission apparatus is provided. The apparatus includes: a transceiver module, configured to: send first indication information to an access network device, where the first indication information indicates an identifier of a data packet that is of a multicast service and that has been received by a terminal device; and receive a target data packet sent by the access network device.

For advantageous effects brought by the foregoing data transmission apparatus, refer to the specific description of the second aspect. For brevity, details are not described herein again.

With reference to the seventh aspect, in some implementations of the seventh aspect, the identifier of the data packet that is of the multicast service and that has been received by the terminal device is a sequence number of the data packet that is of the multicast service and that is received by the terminal device in a PTM mode.

With reference to the seventh aspect, in some implementations of the seventh aspect, a sequence number of the target data packet is less than the sequence number of the data packet that is of the multicast service and that is received by the terminal device in the PTM mode.

With reference to the seventh aspect, in some implementations of the seventh aspect, the sequence number of the data packet that is of the multicast service and that is received by the terminal device in the PTM mode is a sequence number of a first data packet that is of the multicast service and that is received by the terminal device in the PTM mode.

With reference to the seventh aspect, in some implementations of the seventh aspect, the transceiver module is specifically configured to receive the target data packet sent by the terminal device in a PTP mode.

With reference to the seventh aspect, in some implementations of the seventh aspect, the transceiver module is further specifically configured to receive target configuration information sent by the access network device, where the target configuration information is configuration information of the multicast service of the terminal device.

With reference to the seventh aspect, in some implementations of the seventh aspect, the configuration information of the multicast service of the terminal device includes PTM mode configuration information and PTP mode configuration information.

With reference to the seventh aspect, in some implementations of the seventh aspect, the transceiver module is further specifically configured to receive second request information sent by the access network device, where the second request information is used to request the terminal device to report the first indication information.

According to an eighth aspect, a data transmission apparatus is provided. The apparatus includes: a processing module, configured to generate first information, where the first information includes a service identifier of a multicast service and first parameter information, the first parameter information includes at least one of paging identification information, discontinuous reception cycle information, and capability information of each terminal device in a first set of terminal devices, and the first set of terminal devices includes at least two terminal devices; and a transceiver module, configured to send the first information to an access network device.

For advantageous effects brought by the foregoing data transmission apparatus, refer to the specific description of the third aspect. For brevity, details are not described herein again.

With reference to the eighth aspect, in some implementations of the eighth aspect, the first information further includes second parameter information, the second parameter information includes at least one of common paging priority information and common tracking area identity list information of each terminal device in the second set of terminal devices, the second set of terminal devices includes at least two terminal devices, and the second set of terminal devices belongs to the first set of terminal devices.

According to a ninth aspect, a data transmission apparatus is provided. The apparatus includes: a transceiver module, configured to receive first information sent by a core network device, where the first information includes service identifier information of a multicast service and first parameter information, the first parameter information includes at least one of paging identification information, discontinuous reception cycle information, and capability information of each terminal device in a first set of terminal devices, and the first set of terminal devices includes at least two terminal devices; and a processing module, configured to determine sending time of second information based on the first information, where the second information includes the service identifier information of the multicast service. The transceiver module is further configured to send the second information to a first terminal device, where the first terminal device belongs to the first set of terminal devices.

With reference to the ninth aspect, in some implementations of the ninth aspect, the first information further includes a second parameter, the second parameter information includes at least one of paging priority information and tracking area identity list information of each terminal device in a second set of terminal devices, tracking area identity list information of all terminal devices in the second set of terminal devices is the same, the second set of terminal devices includes at least two terminal devices, and the second set of terminal devices belongs to the first set of terminal devices.

With reference to the ninth aspect, in some implementations of the ninth aspect, the second information is centrally sent by the access network device to terminal devices in the second set of terminal devices.

For advantageous effects brought by the foregoing data transmission apparatus, refer to the specific description of the fourth aspect. For brevity, details are not described herein again.

According to a tenth aspect, a data transmission apparatus is provided. The apparatus includes: a processing module, configured to determine sending time of a data packet of a multicast service based on parameter information, where the parameter information includes at least one of the following information: delay information of the multicast service of a terminal device of a multicast group, reliability information of the multicast service of the terminal device of the multicast group, discontinuous reception cycle information of the terminal device of the multicast group, and a ratio of a quantity of terminal devices that are of a multicast group and that access an access network device to a quantity of terminal devices of the multicast group. The core network device sends the data packet of the multicast service to the access network device at the sending time.

For advantageous effects brought by the foregoing data transmission apparatus, refer to the specific description of the fifth aspect. For brevity, details are not described herein again.

With reference to the tenth aspect, in some implementations of the tenth aspect, the processing module is specifically configured to determine the sending time of the data packet of the multicast service based on a delay requirement of the multicast service of the terminal device of the multicast group.

With reference to the tenth aspect, in some implementations of the tenth aspect, the processing module is further specifically configured to determine the sending time of the data packet of the multicast service based on a reliability requirement of the multicast service of the terminal device of the multicast group.

With reference to the tenth aspect, in some implementations of the tenth aspect, the processing module is further specifically configured to: when the terminal device of the multicast group completes one discontinuous reception cycle, determine the sending time of the data packet of the multicast service.

With reference to the tenth aspect, in some implementations of the tenth aspect, the processing module is further specifically configured to: when a ratio of the quantity of terminal devices that are of the multicast group and that access the access network device to the quantity of terminal devices of the multicast group is greater than a preset threshold, determine the sending time of the data packet of the multicast service.

According to an eleventh aspect, a data transmission apparatus is provided, including a processor. The processor is coupled to a memory, and may be configured to execute instructions in the memory, to implement the data transmission method in any one of the first aspect to the fifth aspect and the possible implementations of the first aspect to the fifth aspect. Optionally, the data transmission apparatus further includes the memory. Optionally, the data transmission apparatus further includes a communication interface, the processor is coupled to the communication interface, and the communication interface is configured to input and/or output information. The information includes at least one of instructions and data.

In an implementation, the data transmission apparatus is a network device. When the data transmission apparatus is the network device, the communication interface may be a transceiver or an input/output interface.

In another implementation, the data processing apparatus is a chip or a chip system. When the data transmission apparatus is the chip or the chip system, the communication interface may be an input/output interface, an interface circuit, an output circuit, an input circuit, a pin, a related circuit, or the like on the chip or the chip system. The processor may alternatively be a processing circuit or a logic circuit.

In another implementation, the data transmission apparatus is a chip or a chip system configured in a network device.

Optionally, the transceiver may be a transceiver circuit. Optionally, the input/output interface may be an input/output circuit.

According to a twelfth aspect, a computer-readable storage medium is provided. The computer-readable storage medium stores a computer program. When the computer program is executed by a communication apparatus, a data processing apparatus is enabled to implement the data transmission method in any one of the first aspect to the fifth aspect, and the possible implementations of the first aspect to the fifth aspect.

According to a thirteenth aspect, a computer program product including instructions is provided. When the instructions are executed by a computer, a communication apparatus is enabled to implement the data transmission method provided in the first aspect to the fifth aspect.

DETAILED DESCRIPTION OF ILLUSTRATIVE EMBODIMENTS

The following describes technical solutions of this application with reference to accompanying drawings.

The technical solutions in embodiments of this application are applicable to various communication systems, for example, a fifth generation (5G) system or a new radio (new radio, NR) system, a long term evolution (LTE) system, an LTE frequency division duplex (FDD) system, an LTE time division duplex (TDD) system, and a universal mobile telecommunication system (UMTS).

For ease of understanding embodiments of this application, a communication system used in embodiments of this application is described in detail with reference to FIG. 1 and FIG. 2.

Figure 1:
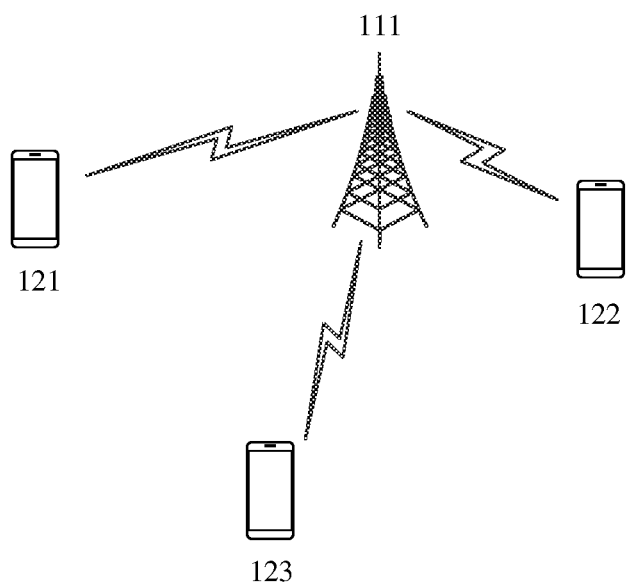
FIG. 1 is a schematic diagram of a wireless communication system 100 applicable to an embodiment of this application.

FIG. 1 is a schematic diagram of a wireless communication system 100 applicable to an embodiment of this application. As shown in FIG. 1, the wireless communication system 100 may include at least one access network device, for example, an access network device 111 shown in FIG. 1. The wireless communication system 100 may further include at least one terminal device, for example, a terminal device 121 to a terminal device 123 shown in FIG. 1. A plurality of antennas may be configured for both the access network device and the terminal device, and the access network device and the terminal device may communicate with each other by using a multi-antenna technology.

Figure 2:
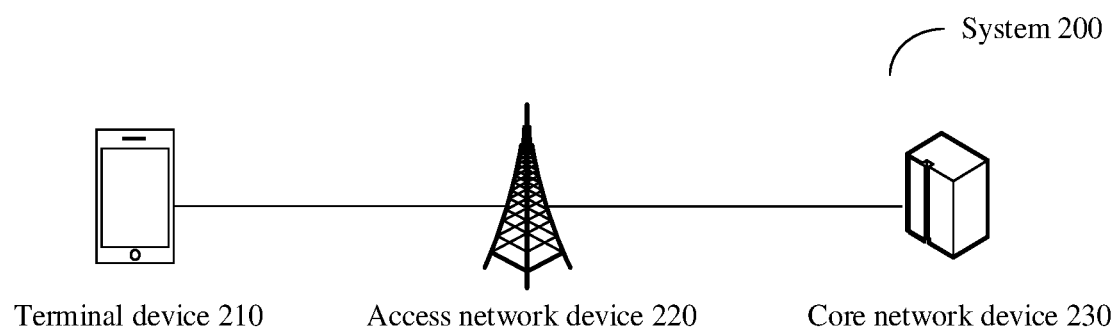
FIG. 2 is a schematic diagram of a wireless communication system 200 applicable to an embodiment of this application.

FIG. 2 is a schematic diagram of a wireless communication system 200 applicable to an embodiment of this application. As shown in FIG. 2, the wireless communication system 200 includes a terminal device 210, an access network device 220, and a core network device 230. The terminal device 210 is an example, and the communication system 200 may include a plurality of terminal devices.

It should be understood that FIG. 1 and FIG. 2 are merely examples for description, and this application is not limited thereto.

It should be further understood that the terminal device may be user equipment, an access terminal, a UE unit, a UE station, a mobile station, a remote station, a remote terminal, a mobile device, a UE terminal, a terminal, a wireless communication device, a multimedia device, a streaming media device, a UE proxy, a UE apparatus, or the like. The access terminal may be a cellular phone, a cordless phone, a session initiation protocol (SIP) phone, a wireless local loop (WLL) station, a personal digital assistant, (PDA), a handheld device having a wireless communication function, a computing device, another processing device connected to a wireless modem, a vehicle-mounted device, a wearable device, a terminal in a future 5G network, a terminal in a future evolved public land mobile network (PLMN) network, or the like.

The access network device is a device that can communicate with the terminal device, and may be a base station, a relay station, or an access point. The base station may be a base transceiver station (BTS) in a global system for mobile communication (GSM) or a code division multiple access (CDMA) network, may be a node base station (NB) in wideband code division multiple access (WCDMA), may be an evolved (Evolutional) NB (eNB or eNodeB) in a long term evolution (LTE), may be a radio controller in a cloud radio access network (CRAN) scenario, may be a base station device in a future 5G network or an access network device in a future evolved PLMN network, or may be a wearable device or a vehicle-mounted device.

The core network (CN) device may be a CN device corresponding to different devices in different systems. For example, in 3G, the core device may correspond to a serving GPRS support node (SGSN) of a general packet radio service (GPRS) technology and/or a gateway GPRS support node (GGSN). In 4G, the core device may correspond to a mobility management entity (MME) and/or a serving gateway (S-GW). In 5G, the core device may correspond to an access and mobility management function node (AMF), a session management function node (SMF), or a user plane function node (UPF).

To facilitate understanding embodiments of this application, the following first briefly describes related technologies in this application.

(1) UE Operating State

In a 4G system, radio resource control (RRC) connection states are classified into an RRC connected state and an RRC idle state. When UE is powered on and has not established a connection to a wireless network, the UE is in an idle state. When the UE has data to be sent/received, the UE needs to establish a connection to the wireless network, that is, the UE needs to enter a connected state for data transmission and reception.

Compared with 4G networks, 5G inherits the concepts of the RRC idle state and the RRC connected state. In addition, another state, namely, an RRC inactive state is introduced to 5G. The three RRC states may be transitioned between each other. The three RRC states are described as follows:

RRC connected state: The UE establishes an RRC connection, the UE may send and receive dedicated data, and based on activity of the UE, discontinuous reception (Discontinuous reception, DRX) may be used to reduce air interface resources and power consumption of the UE.

RRC idle state RRC_IDLE: The UE does not have an RRC connection, and the UE performs cell selection and reselection, monitors a paging channel, and performs tracking area update (Tracking area update, TAU).

RRC inactive state (RRC_INACTIVE): The RRC inactive state is a new state in 5G, and this state enables the UE to quickly return to a connected state.

2. Paging

A paging function is initiated by a network side. Purposes of sending paging by a gNodeB to the UE and corresponding states of the UE are listed in Table 1.

TABLE 1

| Purpose of paging | UE state |
| --- | --- |
| Send a paging request | RRC_IDLE or RRC_INACTIVE |
| Inform UE that a system message is to change | RRC_IDLE, RRC_INACTIVE, or RRC_CONNECTED |
| Notify the UE to prepare for receiving an ETWS primary notification and/or an ETWS secondary notification | RRC_IDLE, RRC_INACTIVE, or RRC_CONNECTED |
| Notify the UE to receive a CMAS notification. | RRC_IDLE, RRC_INACTIVE, or RRC_CONNECTED |

Content of a paging message is sent to the UE by scrambling a physical downlink control channel (PDCCH) using a paging radio network temporary identifier (P-RNTI) to indicate a physical downlink shared channel (PDSCH) resource location. The content of the paging message is sent to the UE via the PDSCH resource location, and a PDSCH resource is indicated by the PDCCH scrambled using the P-RNTI. That is, to obtain the paging message, the UE first needs to periodically wake up and monitor the PDCCH channel scrambled using the P-RNTI, and then parse downlink control information (DCI), to further obtain a time frequency location of the PDSCH channel. Finally, the UE parses the content of the paging message on a corresponding PDSCH.

The UE in the RRC_IDLE/INACTIVE state "wakes up" to receive the paging message only within a predetermined period of time, and a frequency domain resource occupied by the paging message is specified by the PDCCH scrambled using the P-RNTI (0xFFFE). The UE is in a sleep state during other periods, to reduce power consumption and prolong a service life of a UE battery.

Paging may be initiated by the core network or by the access network. A short message may be used to specify which fields are carried in the paging, for example, system information modification (systemInfoModification). If the paging message carries systemInfoModification, the paging message is used to notify the UE of a system information change. Table 2 describes content represented by different bits in the short message.

TABLE 2

| Bit | Short message |
|---|---|
| 1 | Indicate that the system information is changed If it is set to 1, broadcast control channels except an SIB 6, an SIB 7, and an SIB 8 are modified. |
| 2 | Indicate ETWS and CMASIndication If it is set to 1, it indicates the ETWS primary notification, the ETWS secondary notification, and/or the CMAS notification. |
| 3 | Stop paging monitoring. If it is set to 1, monitoring on a PDCCH occasion for paging in this PO is stopped. |
| 4 to 8 | Not used. If it is received, the UE ignores it. |

3. Configuration Information of a Multicast/Multicast Service

Configuration information of a multicast/multicast service is configured by a network and sent to UE. The UE receives service data of an interested multicast/multicast service via the configuration information. The configuration information of the multicast and multicast service may include but is not limited to:
  a service class: an MBS service/session ID, a temporary mobile group identifier, corresponding scheduling information and DRX, a G-RNTI, and power allocation of physical and logical channels; and
  a cell level: a protocol stack/radio bearer; and a configuration of the radio bearer may include corresponding configurations of a packet data convergence protocol layer, a radio link control layer, a media access control layer, and a physical layer Considering NR functions, a bandwidth part (BWP) part of bandwidth or MBS service reception is also necessary. If encryption and/or integrity-based initial protection is applied, relevant configurations should also be delivered.

4. Multicast Service Reception

Currently, the 3GPP standard discusses that a base station may send a multicast service to UE in a point-to-point (PTP) mode and a point-to-multipoint (PTM) mode. The PTM mode is used to send the multicast service to a plurality of UEs at the same time, and the PTP mode is used to send data to only one UE. The base station may dynamically use the two modes to send data to a same UE. A PDCP layer is shared in the two modes.

In conventional technologies, the UE first joins a multicast group, and the UE is released to be in an idle state or an inactive state before a service starts. When the group needs to send data, a CN needs to trigger notification to the UE. For example, the CN may notify the UE using a paging process. Once the UE is paged, the UE accesses a network, the CN sends multicast-related information and UE associated with the multicast service to a base station that serves the UE, and the base station configures an MBS RB for the UE based on the information to receive the multicast service. However, efficiency of sending a paging message from the CN to the UE via the base station is excessively low, and a paging message needs to be triggered for each UE in the group. In addition, the CN or the base station cannot determine proper start time for sending multicast data.

Moreover, if the CN or the base station has started to send multicast data, and new UEs access the network during this period, a manner of processing multicast data missed by these UEs is indefinite.

A paging message triggered for each UE in the group may carry at least one piece of the following information:
1. UE Paging Identification Information.

A UE paging identifier may be a non-access stratum identifier of UE, for example, a 5G-S-TMSI in a 5G communication system. The UE paging identifier has two functions in the 5G communication system. In one aspect, the UE paging identifier needs to be sent to the UE via a UE paging message, so that the UE determines, based on the identifier, whether the UE is paged. In another aspect, an access network device needs to calculate a paging occasion based on the identifier. According to 3GPP TS 3804, calculation of the paging occasion for the UE is related to a result of a non-access stratum identifier of the UE mod 1024 (for example, 5G-S-TMSI mod 1024) and a DRX cycle used by the UE. The DRX cycle used by the UE is determined based on a non-access stratum (Non-Access Stratum, NAS) DRX cycle applied by the UE and a default DRX cycle in a system broadcast. For example, the DRX cycle used by the UE may be determined according to formula 1 and formula 2, where formula 1 represents a manner of determining a system frame number for a paging frame, and formula 2 represents a manner of determining a PO index according to an index (i_s).

$$(SFN+PF\_\text{offset}) \bmod T = (T \text{ div } N) \times (UE\_ID \bmod N) \quad \text{(Formula 1)}$$

$$i\_s = \text{floor}(UE\_ID/N) \bmod Ns \quad \text{(Formula 2)}$$

SFN is the system frame number. PF_offset is an offset used for paging frame (PF) determination. T is the DRX cycle of the UE (T is determined by the shortest of UE specific DRX values, and if the DRX value is configured by an RRC layer and/or an upper layer, the DRX value is a default DRX value broadcast in system information; and in an RRC idle state (RRC_IDLE), if the DRX value specified by the UE is not configured by the upper layer, a default value is applied). N is a number of total paging frames in T. Ns is a number of paging occasions for a PF. UE_ID is a result of 5G-S-TMSI mod 1024.

2. UE DRX Cycle (Optional)

A UE DRX cycle is a DRX cycle applied by a UE NAS stratum. The UE DRX is an optional function. If the UE NAS stratum does not apply for the DRX cycle, the paging message does not include the DRX cycle.

3. Paging Area Information (Optional)

Paging area information may include, for example, a tracking area identity list (TAI list). The paging area information is used by an access network device to send paging only in a cell related to a tracking area identity list when the access network device determines the paging. For example, the access network device corresponds to 10 cells, and the 10 cells separately belong to a TA 1, a TA 2, and a TA 3. If the paging area information carries the TA 1, the access network device sends the paging message only in a cell that has an association relationship with the TA 1.

4. UE Capability Information (Optional)

Currently, UE capability information includes only information about a frequency band supported by UE, and is used by an access network device to send, when the access network device determines to send the paging message, the paging message only on the frequency band supported by the UE and in a cell that is in a TAI list. If the paging message does not carry the UE capability information, a base station sends the paging message in all cells in the TA list.

5. Paging Priority (Optional)

A paging priority is used by a base station to determine a priority for sending the paging message, that is, whether to preferentially send the paging message in the case that there are a large quantity of paging messages in a system.

In view of this, this application provides a data transmission method, to improve paging message efficiency, determine appropriate time at which a CN or a base station sends multicast data, and enable UE that accesses, in a process of sending the multicast data by the CN or the base station, the CN or the base station to receive previously missed multicast data, to optimize a multicast service.

The following describes in detail embodiments provided in this application with reference to the accompanying drawings.

Figure 3:
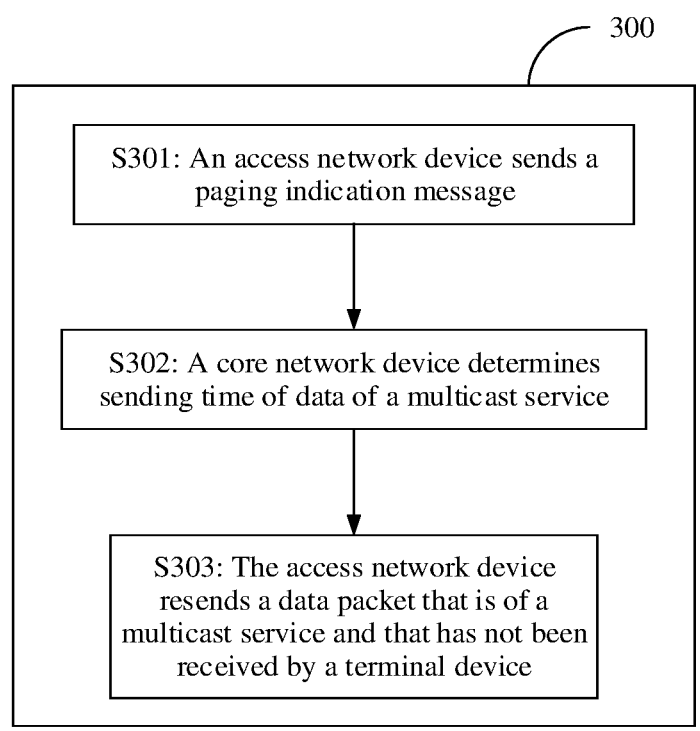
FIG. 3 is a schematic flowchart of a data transmission method 300 according to an embodiment of this application.

FIG. 3 is a schematic flowchart of a data transmission method 300 according to an embodiment of this application. The method 300 may include the following steps.

S301: An access network device receives paging indication information sent by a core network device, and sends a paging message to a terminal device.

For example, after receiving the paging indication information sent by the core network device, the access network device may send the paging message to the terminal device in a multicast group based on the paging indication information. The paging indication information includes dedicated information and common information of the terminal device in the multicast group. The dedicated information includes at least one of a paging identifier, discontinuous reception cycle information, and capability information of each terminal device. The common information includes at least one of same paging priority information and tracking area identity list information of each terminal device. The access network device obtains a paging occasion based on the dedicated information and the common information, and sends the paging message to the terminal device in the multicast group in the paging occasion.

S302: The core network device determines sending time of data of a multicast service.

For example, one multicast group may include a plurality of terminal devices, and these terminal devices cannot access the access network device at the same time. Therefore, before sending the data of the multicast service to the access network device, the core network device determines the sending time of the data of the multicast service. In this way, the data of the multicast service can be flexibly delivered.

S303: The access network device resends, to the terminal device, a data packet that is of a multicast service and that has not been received by the terminal device.

For example, when the access network device has delivered data of the multicast service, and when the terminal device accesses the access network device, the terminal device reports an identifier of a received data packet of a multicast service to the access network device, and the access network device delivers, based on the identifier reported by the terminal device, data that is of a multicast service and that has been delivered but has not been received by the terminal device.

Figure 4:
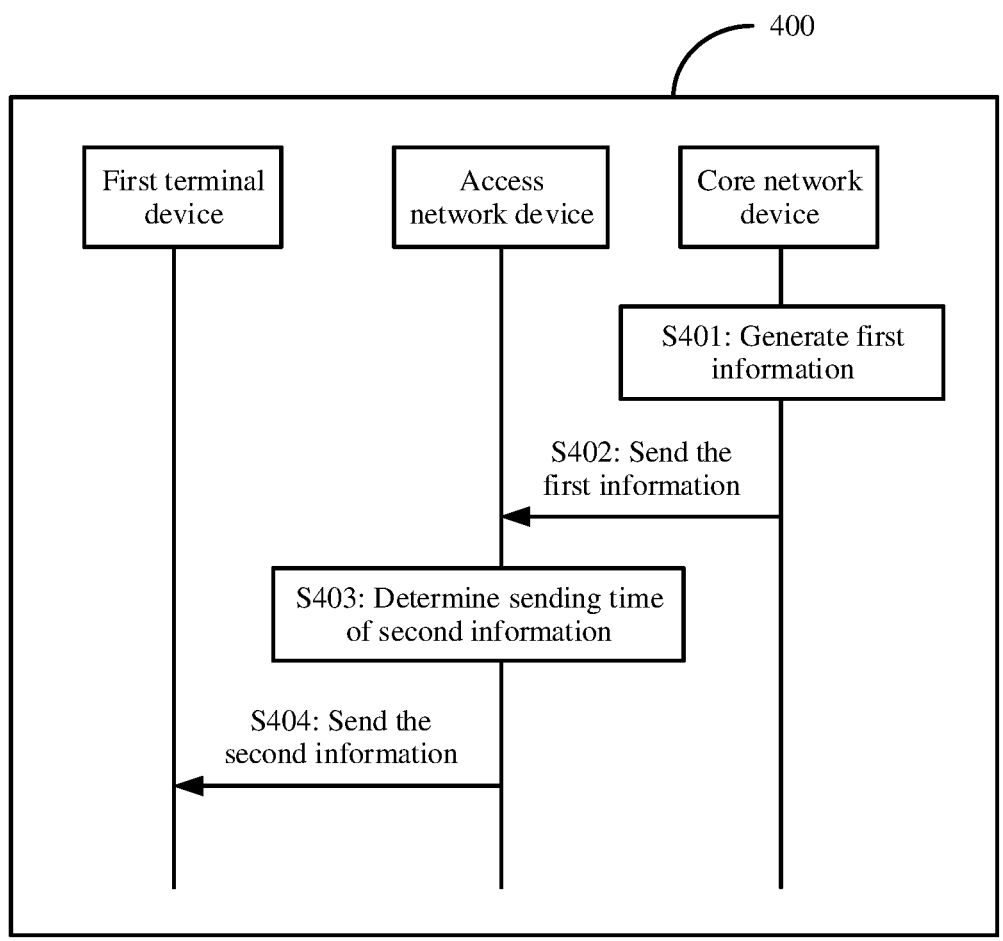
FIG. 4 is a schematic interaction diagram of a data transmission method 400 according to an embodiment of this application.

The following describes step 301 in detail. FIG. 4 is a schematic interaction diagram of a data transmission method 400 according to an embodiment of this application. The method 400 may include the following steps.

S401: The core network device generates first information.

For example, the core network device may generate the first information.

In a possible implementation, the first information may include paging indication information, and the first information includes a service identifier of a multicast service and first parameter information. The first parameter information includes at least one of paging identification information, discontinuous reception cycle information, and capability information of each terminal device in a first set of terminal devices, and the first set of terminal devices includes at least two terminal devices. The first information further includes second parameter information, the second parameter information includes at least one of common paging priority information and common tracking area identity list information of each terminal device in a second set of terminal devices. The second set of terminal devices includes at least two terminal devices, and the second set of terminal devices belongs to the first set of terminal devices.

Specifically, when a multicast group has data to be sent, the core network device needs to notify terminal device that has joined the multicast group that a multicast service is about to start, so that the terminal device accesses the access network device to obtain the service. The notification may be sent in a paging procedure. In this embodiment of this application, the core network device generates the first information, the first information includes the service identifier of the multicast service and the first parameter information. The service identifier of the multicast service is used to notify the access network device of a service identifier for triggering paging. The first parameter information includes at least one of the paging identification information, the discontinuous reception cycle information, and the capability information of each terminal device in the first set of terminal devices. The first set of terminal devices includes at least one terminal device. In addition, a terminal device in the first set of terminal devices is a terminal device that has joined the multicast group but is in an RRC idle state. Further, the first information may further include the second parameter information. The second parameter information includes at least one of the common paging priority information and the common tracking area identity list information of each terminal device in the second set of terminal devices. The second set of terminal devices includes at least one terminal device, and the second set of terminal devices belongs to the first set of terminal devices. The second parameter information is information of common parts of all terminal devices in the second set of terminal devices, that is, paging priority information or tracking area identity list information of all terminal devices in the second set of terminal devices is the same. Content of the first information may be shown in Table 3, and includes information about a UE paging identifier (5G-S-TMSI), a UE DRX cycle, tracking area list (TA list) information, and paging capability information.

TABLE 3

| 5G-S-TMSI | DRX | TA list | Paging capability |
|---|---|---|---|
| a | DRX 1 (320) | TA 1 and TA 2 | Band 1 and band 2 |
| b | | TA 2 and TA 3 | |
| c | DRX 2 (320) | TA 2 and TA 3 | Band 1, band 2, and band 3 |
| d | | TA 1 and TA 2 | |
| e | DRX 1 (320) | TA 1 and TA 2 | Band 1 and band 2 |
| f | DRX 2 (640) | TA 2 and TA 3 | |
| g | DRX 1 (320) | TA 1 and TA 2 | Band 1 and band 2 |

In another possible implementation, the first information may include the service identifier of the multicast service and first parameter information. The first parameter information may include at least one paging index value, and may not need to carry a UE NAS stratum identifier. The paging index value is calculated based on an NAS stratum identifier of a terminal device. For example, the paging index value may be obtained by 5G-S-TMSI mod 1024.

It should be understood that, in a first possible implementation, if results (that is, paging indexes in the following) of a non-access stratum identifier mod 1024 and used DRX cycles (a value of the DRX cycle is a smaller value of an NAS stratum DRX cycle and a default DRX cycle of a cell) of two terminals in the second set of terminal devices are the same, paging occasions calculated by the two terminal devices are the same. Therefore, to enable the access network device to calculate the paging occasion, the core network device does not necessarily need to send, to the access network device, non-access stratum identifiers of all terminal devices and optional DRX cycles corresponding to all the terminal devices. For all terminal devices that have a same result of the non-access stratum identifier mod 1024 and a same NAS stratum DRX cycle, the core network device needs to notify the access network device of only one record thereof.

Further, the first parameter information may further include at least one of information about a NAS stratum DRX cycle corresponding to the paging index value, information about a tracking area list (TA list), or paging capability information, so that the access network device may send a first message based on the paging index value.

Optionally, for terminal devices with a same paging index (5G-S-TMSI mod 1024), if discontinuous reception cycle (DRX cycle) information (if the DRX cycle information is present, the DRX cycle information is considered, and if the DRX cycle information is not present, the DRX cycle information is not considered), tracking area list (TA list) information, and paging capability information (if the paging capability information is present, the paging capability information is considered, and if the paging capability information is not present, the paging capability information is not considered) of at least two terminal devices are the same, the first parameter may carry a related parameter of only one terminal device. As shown in Table 4, paging indexes of a terminal device a, a terminal device b, and a terminal device c are the same. However, DRX cycle information, tracking area list information, and paging capability information of the terminal device a are the same as those of the terminal device c. In this case, the first parameter may carry parameter information of only the terminal device a or only the terminal device c. Similarly, the first parameter may also carry parameter information of only a terminal device e or only a terminal device g.

TABLE 4

| Terminal device | Paging index | DRX cycle | Tracking area list | Paging capability |
|---|---|---|---|---|
| a | x | DRX 1 (320) | TA 1 and TA 2 | Band 1 and band 2 |
| b | x |  | TA 2 and TA 3 |  |
| c | x | DRX 1 (320) | TA 1 and TA 2 | Band 1 and band 2 |
| e | y |  | DRX 1 (320) TA 1 and TA 2 |  |
| f | y | DRX 2 (640) | TA 2 and TA 3 | Band 1, band 2, and band 3 |
| g | y | DRX 1 (320) | TA 1 and TA 2 |  |

Optionally, for related terminal devices that have a same paging index and a same DRX cycle, the first parameter may include parameter information of only one group of terminal devices, so that the core network device may send only one piece of record information. The tracking area list (TA list) information may be a combination of tracking area list (TA list) information of all related terminal devices. Further, the paging capability information may alternatively be a set of paging capability information of all related terminal devices, or may not carry the paging capability information. As shown in Table 5, the paging index information and the DRX cycle information of the terminal device a are the same as those of the terminal device d, so that the tracking area list information and the paging capability of the terminal device a and the terminal device d may be integrated, to obtain the first parameter that includes paging index information x, DRX cycle information DRX 1 (320), tracking area list information TA 1, TA 2, and TA 3, and paging capability information band 1, band 2, and band 3. In addition, the paging index information and the DRX cycle information of the terminal device b are the same as those of the terminal device c. In this case, the tracking area list information and the paging capability of the terminal device b and the terminal device c may be integrated, to obtain the first parameter that includes the paging index information x and the tracking area list information TA 1, TA 2, and TA 3.

TABLE 5

| Terminal device | Paging index | DRX cycle | Tracking area list | Paging capability |
|---|---|---|---|---|
| a | x | DRX 1 (320) | TA 1 and TA 2 | Band 1 and band 2 |
| b | x |  | TA 2 and TA 3 |  |
| c | x |  | TA 1 |  |
| d | x | DRX 1 (320) | TA 1, TA 2, and TA 3 | Band 1, band 2, and band 3 |

Results obtained through integration are shown in Table 6. Based on the combination results, the core network device needs to send only two records to the access network device. For example, the core network device may send, to the access network device, information corresponding to other columns other than the $1^{st}$ column in Table 6.

TABLE 6

| Terminal device | Paging index | DRX cycle | Tracking area list | Paging capability |
|---|---|---|---|---|
| a and d | x | DRX 1 (320) | TA 1, TA 2, and TA 3 | Band 1, band 2, and band 3 |
| b and c | x |  | TA 1, TA 2, and TA 3 |  |

It should be understood that if tracking area lists (TA lists) corresponding to all paging indexes have a same TAI, the same TAI may be sent as a common tracking area identity list (TAI list), and the common tracking area identity list is independent of a paging index set. Therefore, a tracking area identity list that actually corresponds to each paging index may be a combination of the common tracking area identity list and a tracking area identity list separately corresponding to each paging index.

It should be further understood that there may be only one paging priority for an entire paging message, and a paging priority does not need to be set for each terminal device or each paging index.

In addition, optionally, in the foregoing two implementations, if the core network device expects the access network device to send, at all configured paging time, paging information that carries the service identifier of the multicast service, the core network device may not carry information, for example, paging identification information or paging index information, and DRX cycle information of the terminal device, used to calculate the paging occasion. For example, if the first information carries only the tracking area list information, and does not carry the paging identification information or the paging index information of the terminal device, the access network device may send the paging message at all the configured paging time in all cells related to the tracking area list.

S402: The core network device sends the first information to the access network device.

For example, after generating the first information, the core network device may send the first information to the access network device.

S403: The access network device determines sending time of second information.

For example, after receiving the first information, the access network device may determine time for delivering the second information, where the second information includes the service identifier information of the multicast service.

In a possible implementation, after receiving the first information, the access network device may calculate all paging occasions based on the paging identifier of each terminal device included in the first parameter information and discontinuous reception cycle information corresponding to the paging identifier. The paging occasion is time at which the access network device sends the second information to the terminal device in the multicast group. The access network device may send, on a paging occasion corresponding to each terminal, the second information that carries the service identifier. In addition, the access network device may centrally send the second information to terminal devices in the second set of terminal devices based on common information, that is, the access network device needs to send the second information to the terminal devices in the second set of terminal devices for only one time.

In another possible implementation, after receiving the first information, the access network device may calculate, based on the paging index information included in the first parameter information and the DRX cycle information that may be carried in the first parameter information, a paging occasion corresponding to each paging index (refer to the foregoing formula 1 and formula 2), that is, time at which the second information is delivered. The access network device sends the second information that carries the service identifier on these paging occasions. Optionally, area information for sending the second information may be determined based on TA list information corresponding to the paging index, and frequency band information for sending the second information may be determined based on paging capability information corresponding to the paging index. If the paging capability information is not present, the access network device may send the second information in all cells included in the TA list. If the first information includes a common tracking area identity list corresponding to all paging indexes, for each paging index, the access network device may determine that a tracking area for sending paging by the paging index is a union set of the common tracking area list and a tracking area list corresponding to the paging index.

Optionally, in the foregoing two implementations, if the core network device does not carry information used to calculate the paging occasion, for example, the core network device does not carry paging identification information or paging index information or DRX cycle information of the terminal device, and the first information may carry only the tracking area list information, and does not carry the paging identification information or the paging index information of the terminal device, the access network device may send the paging message on all configured paging occasions in all cells related to the tracking area list. All configured paging occasions in a cell refer to paging occasions that are configured in a cell system broadcast and that are used for paging.

S404: The access network device sends the second information to a first terminal device.

For example, the access network device may send the second information to the first terminal device, and the first terminal device belongs to the first set of terminal devices. Alternatively, the access network device may send the second information to the first terminal device on a determined paging occasion based on the paging occasion determined by the first information. Further, when the first information includes a second parameter, the access network device may centrally send the second information to the terminal devices in the second set of terminal devices, that is, the access network device needs to send the second information to the terminal devices in the second set of terminal devices for only one time.

Specifically, after receiving the first information, the access network device may send the second information to the first terminal device on the paging occasion, that is, send the paging message. When the first information includes the second parameter, the access network device may send a piece of second information to the terminal devices in the second set of terminal devices based on the second parameter in the first information. After receiving the message, the terminal device checks the service identifier of the multicast service. If the terminal device joins the multicast service, the terminal device initiates a connection establishment process to access the access network device. Further, the terminal device may initiate request information of the multicast service to the core network device, and the core network device may determine, based on the request information, that the terminal device has accessed a network.

Based on the foregoing solution, the access network device may determine the paging occasion based on the first information, and send the second information to all terminal devices that monitor the paging time, where the second information carries the service identifier. This overcomes a problem that efficiency is excessively low because the access network device needs to separately send paging indication information to each terminal device in the multicast group, reduces a quantity of paging indication information sent by the core network to the access network device, and reduces signaling transmission. Therefore, sending efficiency of the paging indication information is greatly improved.

Figure 5:
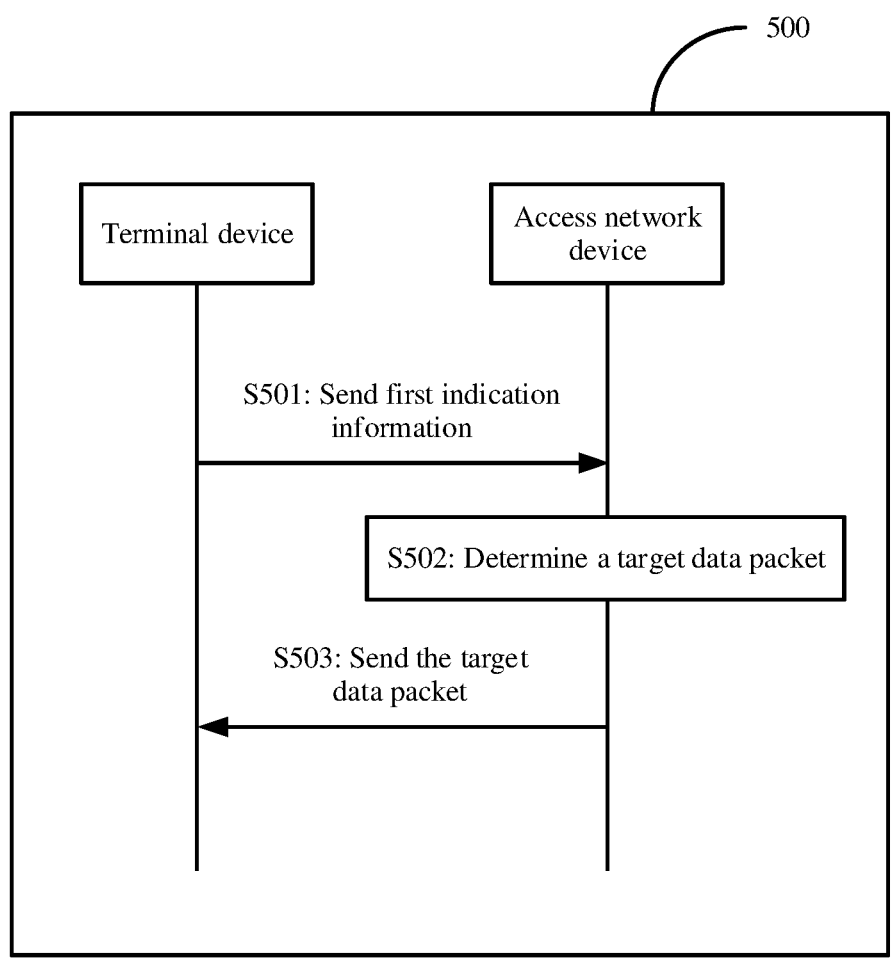
FIG. 5 is a schematic interaction diagram of a data transmission method 500 according to an embodiment of this application.

The following describes step 303 in detail. FIG. 5 is a schematic interaction diagram of a data transmission method 500 according to an embodiment of this application. The method 500 may include the following steps.

S501: The terminal device sends first indication information to the access network device.

For example, the terminal device may send the first indication information to the access network device, where the first indication information indicates an identifier of a data packet that is of a multicast service and that has been received by the terminal device, to notify the access network device of the identifier of the data packet that is of the multicast service and that has been received by the terminal device.

Specifically, after receiving target configuration information, the terminal device initializes a receive window, to facilitate receiving of the multicast service. In other words, the terminal device receives a PDCP data packet of the multicast service in a PTM mode based on PTM mode configuration information, determines a receiving status of the PDCP data packet received in the PTM mode, and sends the first indication information, that is, sends an identifier of the data packet that is of the multicast service and that is received in the PTM mode to the access network device. Specifically, the terminal device may send the first indication information by using a PDCP status report, or may report the first indication information to the access network device by using RRC signaling. A mode for sending the first indication information by the terminal device is not limited in this application.

For example, after receiving the target configuration information, the terminal device receives the data packet of the multicast service in the PTM mode based on a G-RNTI, performs data processing, and then sends the identifier of the data packet to the access network device. The identifier of the data packet that is of the multicast service and that has been received by the terminal device may be a sequence number of the data packet that is of the multicast service and that is received by the terminal device in the PTM mode, and may further be a sequence number of a first data packet that is of the multicast service and that is received by the terminal device in the PTM mode.

It should be understood that the terminal device may send, to the access network device, the sequence number of the first data packet that is of the multicast service and that is received by the terminal device in the PTM mode, a sequence number of a received data packet with a smallest sequence number, or sequence numbers of all received data packets. This is not limited in this application.

Optionally, before receiving the first indication information, the access network device may send second request information to the terminal device, where the second request information is used to request the terminal device to report the first indication information.

In a possible implementation, before the access network device receives the first indication information of the terminal device, the access network device may receive second indication information sent by the core network device, where the second indication information indicates that the terminal device needs to receive the data packet of the multicast service. This helps the access network device determine that the terminal device needs to receive the data packet of the multicast service. The second indication information may be carried in signaling related to the terminal, for example, a PDU session establishment message, an initial context setup message, and an initial context modification message for the terminal. Specifically, the second indication information may indicate a QoS flow corresponding to a multicast service that needs to be received by the terminal. Alternatively, the second indication information may be carried in a multicast service establishment message. For example, the indication information is a multicast service establishment message carrying a UE identifier, and the UE identifier indicates that UE needs to receive the multicast service.

Optionally, before receiving the second indication information, the access network device may send first request information to the core network device, where the first request information is used to request the core network device to deliver the second indication information.

In another possible implementation, the core network device may send information about a cell and third indication information to the access network device, where the third indication information indicates that a terminal that is in a first state and that is in the cell receives the multicast service. For example, the third indication information indicates whether a terminal in the first state receives the multicast service in the cell, indicates a quantity of terminals that are in the first state and that receive the multicast service in the cell, or indicates terminal identification information of a terminal that is in the first state and that receives the multicast service in the cell. The first state may be an RRC idle state, an RRC inactive state, or a combination of the RRC idle state and the RRC inactive state. The third indication information may also be carried in a multicast service establishment message, or may be carried in signaling related to the terminal device, for example, a message such as a protocol data unit session establishment message, an initial context setup message, and an initial context modification message for the terminal device. The second indication information and the third indication information may be carried in a same message or in different messages. Alternatively, the second indication information and the third indication information may be sent independently. For example, only the second indication information is sent and the third indication information is not sent, or only the third indication information is sent and the second indication information is not sent. This application is not limited herein.

Optionally, because the access network device needs to determine whether the terminal device needs to receive the data packet of the multicast service, the access network device needs to send the first request information to request the core network device to deliver the second indication information, where the second indication information indicates that the terminal device needs to receive the data packet of the multicast service.

Further, after receiving the second indication information, the access network device may determine target configuration information.

For example, the access network device determines that the terminal device needs to receive the data packet of the multicast service, and configures the target configuration information for the terminal device, where the target configuration information is configuration information of the multicast service of the terminal device, and the configuration information further includes PTM mode configuration information and PTP mode configuration information. The PTM mode uses a G-RNTI to receive multicast data, and the PTP mode uses a C-RNTI to receive the multicast data.

In a possible implementation, after learning, from the core network device, that the terminal device needs to receive the data packet of the multicast service, the access network device configures, for the terminal device, configuration information of a multimedia broadcast multicast service radio bearer (Multimedia broadcast multicast service radio bearer, MRB) MRB for receiving data of the multicast service. Further, the MRB configuration information includes the PTM mode configuration information and the PTP mode configuration information. The PTM configuration information may include G-RNTI configuration information, RLC configuration information, and other configuration information. The PTP mode configuration information may include the RLC configuration information and other configuration information. Optionally, the access network device further configures control information of a PDCP receive window of the MRB of the terminal device, so that the terminal device may set an initial location of the PDCP receive window of the MRB based on the control information.

In another possible implementation, the access network device determines, based on third indication information, that a terminal device that is in a second state and that receives the multicast service exists, and the access network device determines that the target configuration information includes the PTM configuration information, so that the access network device sends, based on the PTM configuration, the multicast service to the terminal device in the second state in a cell. Because terminal devices in the second state do not have an uplink feedback channel, the access network device cannot learn channel states of these terminal devices, and can perform PTM scheduling only based on cell edge coverage. Alternatively, if it is determined, based on the third indication information, that no terminal device in the second state receives the multicast service, the access network device may perform PTM or PTP scheduling based on a terminal device in a non-first state (a terminal device in an RRC connected state). The third indication information may be used to avoid a scheduling problem caused by the following situation: The access network device does not learn whether a terminal device in the second state exists in the cell. For example, if the terminal device in the second state does not exist in the cell, but the access network device does not learn that the terminal device does not exist, a terminal device at an edge of the cell can only be scheduled according to a conservative policy. As a result, scheduling efficiency is low.

Further, after determining the target configuration information of the terminal device, the access network device sends the target configuration information to the terminal device.

In a possible implementation, an initial sequence number of a PDCP receive window of a unicast service starts from 0. However, for a multicast service, because the multicast service may have already been in transmission when the terminal device accesses the multicast service, it is not necessarily appropriate that an initial sequence number of a PDCP receive window of the multicast service starts from 0. In this case, if the access network device configures a control parameter of the receive window for the terminal device, the terminal device may adjust a location of the receive window by changing the control parameter. For example, if the access network device notifies the terminal device that the initial sequence number of the receive window of the multicast service is 100, the terminal device may directly set the initial sequence number of the receive window of the multicast service to 100, and the access network device may modify an initial location of the receive window by using a data packet that is of the multicast service and that is buffered by the MRB. For example, during data packet sending, a sequence number of a data packet that has been sent by the access network device by using the multicast service is 150, but data packets whose sequence numbers are 130 to 150 are still stored in a buffer. In this case, the terminal device may be notified to change the initial location of the receive window to 130. In this way, the access network device may send the data packets whose sequence numbers are 130 to 150 to the terminal device in the PTP mode. This situation may also occur in a handover process. For example, when UE is handed over from another base station to a current base station, data that is transmitted before the UE receives a first data packet from the current base station in the PTM mode and after the UE receives a last data packet from the another station needs to be transmitted to the UE in the PTP mode.

In another possible implementation, if the access network device determines, based on the third indication information, that the terminal device in the second state receives the multicast service, that the access network device sends target configuration information to the terminal device after the access network device determines the target configuration information of the terminal device includes: sending, through a broadcast channel or a multicast control channel (Multicast control channel, MCCH), the target configuration information to the terminal device in the second state, where the terminal device in the second state can receive a service only in a PTM manner, and cannot perform supplementary transmission in the PTP mode; or sending, through dedicated signaling, the target configuration information to the terminal device before the terminal device in the second state enters the second state. It should be understood that, because the terminal device in the second state can receive the service only in the PTM manner, and cannot perform supplementary transmission in the PTP mode, the terminal device in this state cannot perform a subsequent step of resending a data packet to the terminal device.

S502: The access network device determines a target data packet.

For example, after receiving the first indication information, the access network device determines the target data packet based on the first indication information.

Specifically, after receiving the sequence number of the data packet that is of the multicast service and that is received by the terminal device in the PTM mode, the access network device determines, based on the sequence number, a data packet that needs to be sent to the terminal device in the PTP mode, that is, the target data packet.

S503: The access network device sends the target data packet to the terminal device.

For example, after determining the target data packet, the access network device sends the target data packet to the terminal device.

For example, if the terminal device indicates, through the first indication information, that a sequence number of a first data packet that is of the multicast service and that is received by the terminal device in the PTM mode is 15, the access network device uses data packets whose sequence numbers are 1 to 14 as target data packets, and sends the target data packets to the terminal device in the PTP mode.

It should be understood that, in this embodiment of this application, the terminal device may access the access network in a period when the access network device sends the data packet of the multicast service, and receive the data packet of the multicast service. Alternatively, the terminal device may receive the data packet of the multicast service in a state of accessing the access network device, but in a process in which the access network device sends the data packet of the multicast service. This is not limited in this application.

Based on the foregoing solution, the terminal device feeds back, to the access network device, the identifier of the data packet that is of the multicast service and that is received in the PTM mode, and the access network device may determine, based on identifier information reported by the terminal device, a data packet that has been sent in the PTM mode but has not been received by the terminal device, that is, the target data packet, and send the target data packet to the terminal device in the PTP mode. In this way, the terminal device may receive a missed data packet that is of a multicast service and that is sent by the access network device because the terminal device accesses the access network device in a process of sending a data packet of a multicast device, or because the terminal device starts to receive a data packet when the access network device sends a data packet of a multicast service.

Figure 6A:
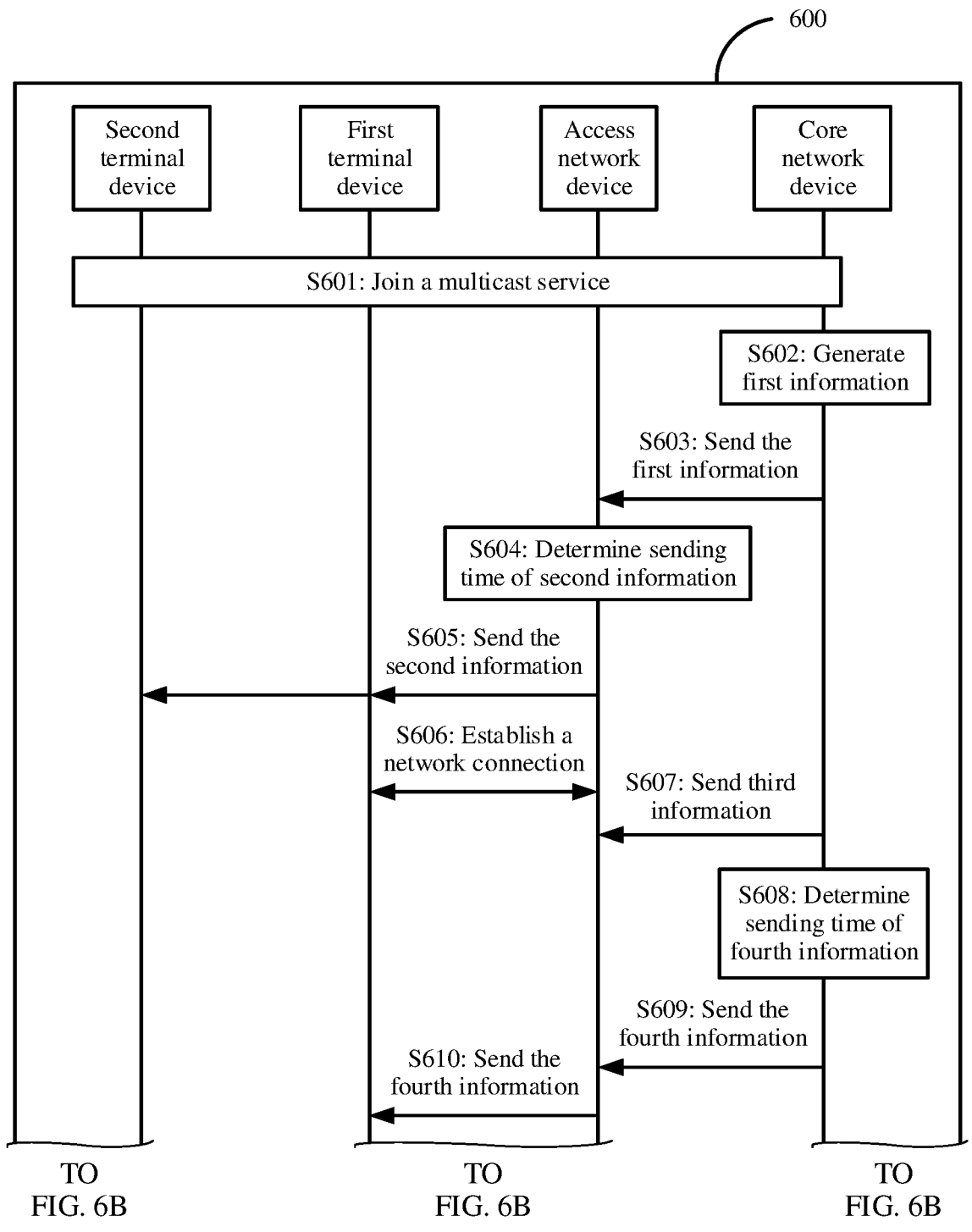
FIG. 6A and FIG. 6B are a schematic interaction diagram of a data transmission method 600 according to an embodiment of this application.
Figure 6B:
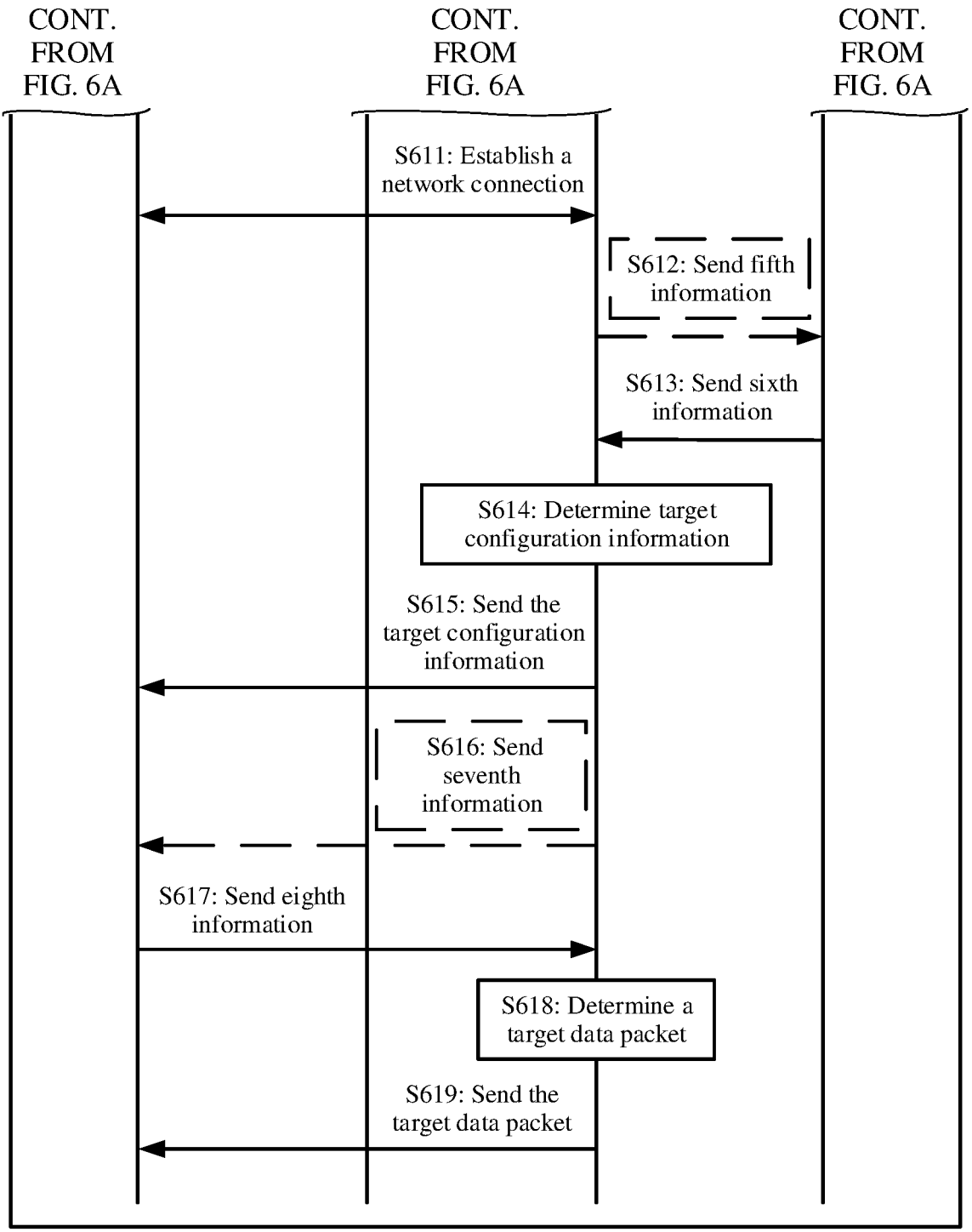

FIG. 6A and FIG. 6B are a schematic interaction diagram of a data transmission method 600 according to an embodiment of this application. The method 600 may include the following steps.

S601: A first terminal device and a second terminal device join a multicast service.

For example, the first terminal device and the second terminal device may obtain a service identifier of the multicast service or a multicast address of the multicast service in advance, and send non-access stratum signaling to a core network device to request to join a multicast group, or join, based on the multicast address of the multicast service, the multicast service by using a joining process of an internet group management protocol.

S602: The core network device generates first information.

For example, the core network device may generate the first information, where the first information may include paging indication information, the first information includes a service identifier of a multicast service and first parameter information, the first parameter information includes at least one of paging identification information, discontinuous reception cycle information, and capability information of each terminal device in a first set of terminal devices, and the first set of terminal devices includes at least two terminal devices. Further, the first information may further include second parameter information, the second parameter information includes at least one of common paging priority information and common tracking area identity list information of each terminal device in a second set of terminal devices, the second set of terminal devices includes at least two terminal devices, and the second set of terminal devices belongs to the first set of terminal devices. For a specific description of the first information, refer to the description of the first information in S401. For brevity, details are not described herein again in this application.

S603: The core network device sends the first information to an access network device.

For example, after generating the first information, the core network device may send the first information to the access network device.

S604: The access network device determines sending time of second information.

For example, after receiving the first information, the access network device may determine the sending time of the second information. For a specific description of determining, by the access network device, the sending time of the second information, refer to the description of determining the sending time of the first information in step S403. For brevity, details are not described herein again in this application.

S605: The access network device sends the second information to the first terminal device and the second terminal device.

For example, the access network device may send the second information to the first terminal device and the second terminal device.

Specifically, after receiving the first information, the access network device sends the first information to the first terminal device and the second terminal device in the multicast group on a paging occasion, that is, sends a paging message. The access network device may centrally send the second information to terminal devices in the second set of terminal devices based on a second parameter in the first information, that is, the access network device needs to send the second information to the terminal devices in the second set of terminal devices for only one time.

S606: The first terminal device establishes a network connection to the access network device.

For example, after receiving the first information, the first terminal device checks the service identifier of the multicast service. If the first terminal device joins the multicast service, the first terminal device may initiate a connection establishment process to access the access network device. Further, the first terminal device may initiate request information of the multicast service to the core network device, and the core network device may determine, based on the request information, that the first terminal device has accessed the network.

S607: The core network device sends third information to the access network device.

For example, the core network device may send the third information to the access network device, where the third information includes parameter information of the multicast service.

Specifically, after confirming that the first terminal device accesses the network, the core network device configures a transmission parameter of the multicast service for the access network device, and sends the parameter information of the multicast service to the access network device. For example, the access network device may send quality of service information parameter of a to-be-sent multicast service to the access network device, and notify the access network device that the first terminal device needs to receive data of the multicast service. In addition, the access network device may configure, for the first terminal device based on the parameter information of the multicast service, an MRB for receiving the multicast service, and after receiving the multicast service data delivered by the core network device, the access network device may send the multicast service data to the first terminal device through the MRB.

S608: The core network device determines sending time of fourth information.

For example, the core network device may determine the sending time of the fourth information, where the fourth information includes data of the multicast service, that is, the core network device may determine sending time of data of a multicast service to be sent to the access network device.

In a possible implementation, the core network device may determine the sending time of the fourth information based on a delay requirement of the multicast service of the terminal device in the multicast group. For a service that has a high delay requirement, the access network device may wait until the sending time of the fourth information is earlier than the delay requirement to send the data of the multicast service to the access network device, to reserve time for the access network device to deliver the data to the terminal device. For a service with a low delay requirement, the access network device may start sending when an access proportion of terminal devices that access the access network device reaches a preset threshold.

In another possible implementation, the core network device may determine the sending time of the fourth information based on a reliability requirement of the multicast service of the terminal device in the multicast group. For a service that requires no packet loss, the access network device may send the fourth information after all terminal devices in the multicast group access the access network device.

In another possible implementation, the access network device may determine the sending time of the fourth information based on discontinuous reception cycle information of the terminal device in the multicast group. Generally, the terminal device accesses the access network device after receiving a paging indication message for only one time in a discontinuous reception cycle, and the core network device sends the fourth information after the discontinuous reception cycle ends. In this case, terminal devices that receive the paging indication message basically have already accessed the access network device.

In another possible implementation, the core network device may determine the sending time of the fourth information based on a ratio of a quantity of terminal devices that are in the multicast group and that access the access network device to a quantity of terminal devices in the multicast group. The core network device may send the fourth information after a specific proportion of terminal devices access the access network device. For example, 95% of terminal devices in the multicast group access the access network device, and the core network device may send the fourth information to the access network device. The proportion may be a preset fixed proportion, or may be a proportion configured based on operation management and maintenance platform. This is not limited in this application.

It should be understood that the core network device may alternatively send the fourth information to the access network device, and the access network device determines sending time for delivering the fourth information. For example, the access network device may deliver the fourth information based on a requirement on the multicast service of the terminal device.

S609: The core network device sends the fourth information to the access network device.

For example, after determining the sending time of the fourth information, the core network device may send the fourth information to the access network device.

S610: The access network device sends the fourth information to the first terminal device.

For example, after receiving the fourth information sent by the core network device, the access network device sends the fourth information to the first terminal device.

S611: The second terminal device establishes a network connection to the access network device.

For example, the second terminal device initiates an establishment process to access the access network device. In addition, the second terminal device initiates request information of the multicast service to the core network device, and the core network device may determine, based on the request information, that the second terminal device has accessed the network.

S612: The access network device sends fifth information to the core network device.

Optionally, because the access network device needs to determine whether the second terminal device needs to receive the data packet of the multicast service, the access network device needs to send the fifth information to request the core network device to deliver sixth information, to indicate that the second terminal device needs to receive the data packet of the multicast service.

Specifically, the access network device may send the fifth information to the core network device, where the fifth information is used to request the core network device to deliver the sixth information. The sixth information indicates that the second terminal device needs to receive the data packet of the multicast service, to help the access network device determine that the second terminal device needs to receive the data packet of the multicast service.

S613: The core network device sends the sixth information to the access network device.

For example, the core network device may send the sixth information to the access network device.

Optionally, the core network device may send the sixth information to the access network device based on the fifth information.

S614: The access network device determines target configuration information.

For example, the access network device determines that the second terminal device needs to receive the data packet of the multicast service, and configures the target configuration information for the second terminal device, where the target configuration information is configuration information of the multicast service of the second terminal device, and the configuration information further includes PTM mode configuration information and PTP mode configuration information. For a specific description of the target configuration information, refer to the description of the target configuration information in step 501. For brevity, details are not described herein again in this application.

S615: The access network device sends the target configuration information to the second terminal device.

For example, after determining the target configuration information of the second terminal device, the access network device may send the target configuration information to the second terminal device. For a specific description of sending the target configuration information, refer to the description of sending the target configuration information in step 501. For brevity, details are not described herein again in this application.

S616: The access network device sends seventh information to the second terminal device.

Optionally, the access network device may send the seventh information to the second terminal device, where the seventh information is used to request the second terminal device to report eighth information. The eighth information indicates an identifier of the data packet that is of the multicast service and that has been received by the second terminal device, to notify the access network device of the identifier of the data packet that is of the multicast service and that has been received by the second terminal device. For a specific description of the eighth information, refer to the description of the first indication information in step 501. For brevity, details are not described herein again in this application.

S617: The second terminal device sends the eighth information to the access network device.

For example, the second terminal device may send the eighth information to the access network device, to notify the access network device of the identifier of the data packet that is of the multicast service and that has been received by the second terminal device.

Optionally, the second terminal device may send the eighth information to the access network device based on the seventh information.

S618: The access network device determines a target data packet.

For example, the access network device receives the seventh information, and determines the target data packet based on the seventh information.

Specifically, after receiving the identifier of the data packet that is of the multicast service and that is received by the second terminal device in the PTM mode, the access network device may determine, based on the identifier, a data packet that needs to be sent to the second terminal device in the PTP mode, that is, the target data packet.

S619: The access network device sends the target data packet to the second terminal device.

For example, after determining the target data packet, the access network device may send the target data packet to the second terminal device.

For a specific description of sending the target data packet, refer to the description of sending the target data packet in step 503. For brevity, details are not described herein again in this application.

Based on the foregoing solution, the access network device may send, based on common information in the first information, a same paging message to terminal devices in the second set of terminal devices that includes the common information, to avoid sending different paging messages to different terminal devices. This greatly improves paging message sending efficiency. In addition, the core network device determines the sending time of the third information, so that the core network device can send the data of the multicast service to the access network device at more appropriate time. This improves flexibility of sending the data of the multicast service by the core network device or the access network device. In addition, the second terminal device feeds back, to the access network device, an identifier of the data packet that is of the multicast service and that is received in the PTM mode, so that the access network device may determine, based on the identifier, data packets that have been sent but has not been received by the second terminal device, and resend these data packets to the second terminal device in the PTP mode. Therefore, the second terminal device may receive missed data packets of the multicast service. Therefore, effect of optimizing the multicast service is achieved.

Embodiments described in this specification may be independent solutions, or may be combined based on internal logic. All these solutions fall within the protection scope of this application.

It may be understood that, in the foregoing method embodiments, the methods and the operations implemented by the terminal device may alternatively be implemented by a component (for example, a chip or a circuit) used in the terminal device, and the methods and the operations implemented by the network device may alternatively be implemented by a component (for example, a chip or a circuit) used in the network device.

The foregoing describes in detail the methods provided in the embodiments of this application with reference to FIG. 3 to FIG. 6A and FIG. 6B. The following describes in detail communication apparatuses provided in embodiments of this application with reference to FIG. 7 to FIG. 10. It should be understood that descriptions of apparatus embodiments correspond to the descriptions of the method embodiments. Therefore, for content that is not described in detail, refer to the foregoing method embodiments. For brevity, details are not described herein again.

The foregoing mainly describes the solutions provided in embodiments of this application from the perspective of interaction between network elements. It may be understood that, to implement the foregoing functions, each network element such as a transmitting device or a receiving device includes a corresponding hardware structure and/or software module for performing each function. A person skilled in the art may be aware that, with reference to the examples described in embodiments disclosed in this specification, units and algorithm steps can be implemented by hardware or a combination of computer software and hardware in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, division into functional modules may be performed on the transmitting device or the receiving device based on the foregoing method example. For example, each functional module may be obtained through division corresponding to each function, or two or more functions may be integrated in one processing module. The integrated module may be implemented in a form of hardware, or may be implemented in a form of a software functional module. It should be noted that, in embodiments of this application, module division is an example, and is merely a logical function division. In actual implementation, another division manner may be used. An example in which each functional module is obtained through division based on each corresponding function is used below for description.

Figure 7:
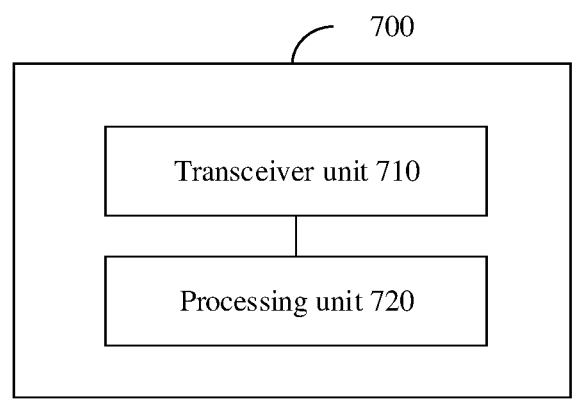
FIG. 7 is a schematic block diagram of a communication apparatus 700 applicable to an embodiment of this application.

FIG. 7 is a schematic block diagram of a communication apparatus according to an embodiment of this application. The communication apparatus 700 includes a transceiver unit 710 and a processing unit 720. The transceiver unit 710 may implement a corresponding communication function, and the processing unit 710 is configured to perform data processing. The transceiver unit 710 may also be referred to as a communication interface or a communication unit.

Optionally, the communication apparatus 700 may further include a storage unit. The storage unit may be configured to store instructions and/or data. The processing unit 720 may read the instructions and/or the data in the storage unit, to enable the communication apparatus to implement the foregoing method embodiments.

The communication apparatus 700 may be configured to perform actions performed by the terminal device in the foregoing method embodiments. In this case, the communication apparatus 700 may be the terminal device or a component that can be configured in the terminal device, the transceiver unit 710 is configured to perform receiving/sending-related operations on a terminal device side in the foregoing method embodiments, and the processing unit 720 is configured to perform processing-related operations on the terminal device side in the foregoing method embodiments.

Alternatively, the communication apparatus 700 may be configured to perform actions performed by the network device in the foregoing method embodiments. In this case, the communication apparatus 700 may be the network device or a component that can be configured in the network device, the transceiver unit 710 is configured to perform receiving/sending-related operations on a network device side in the foregoing method embodiments, and the processing unit 720 is configured to perform processing-related operations on the network device side in the foregoing method embodiments.

In a design, the communication apparatus 700 is configured to perform actions performed by the first terminal device in the embodiment shown in FIG. 4, and the transceiver unit 710 is configured to perform S404.

In an example, the communication apparatus 700 is configured to perform actions performed by the terminal device in the embodiment shown in FIG. 5, and the transceiver unit 710 is configured to perform S501 and S503.

In still another example, the communication apparatus 700 is configured to perform actions performed by the first terminal device in the embodiment shown in FIG. 6A and FIG. 6B, and the transceiver unit 710 is configured to perform S601, S605, S606, and S610.

In still another example, the communication apparatus 700 is configured to perform actions performed by the second terminal device in the embodiment shown in FIG. 6A and FIG. 6B, and the transceiver unit 710 is configured to perform S601, S605, S611, S615, S617, and S619.

The communication apparatus 700 may implement steps or procedures performed by the terminal device in the method 400, the method 500, and the method 600 based on embodiments of this application. The communication apparatus 700 may include units configured to perform methods performed by the terminal device in the method 400 in FIG. 4, the method 500 in FIG. 5, and the method 600 in FIG. 6A and FIG. 6B. In addition, the units in the communication apparatus 700 and the foregoing other operations and/or functions are separately used to implement corresponding procedures of the method 400 in FIG. 4, the method 500 in FIG. 5, and the method 600 in FIG. 6A and FIG. 6B.

When the communication apparatus 700 is configured to perform the method 400 in FIG. 4, the transceiver unit 710 may be configured to perform step 404 in the method 400.

When the communication apparatus 700 is configured to perform the method 500 in FIG. 5, the transceiver unit 710 may be configured to perform steps 501 and 503 in the method 500.

When the communication apparatus 700 is used as the first terminal device and is configured to perform the method 600 in FIG. 6A and FIG. 6B, the transceiver unit 710 may be configured to perform steps 601, 605, 606, and 610 in the method 600.

When the communication apparatus 700 is used as the second terminal device and is configured to perform the method 600 in FIG. 6A and FIG. 6B, the transceiver unit 710 may be configured to perform steps 601, 605, 611, 615, 617, and 619 in the method 600.

It should be understood that a specific process in which the units perform the foregoing corresponding steps is described in detail in the foregoing method embodiments, and for brevity, details are not described herein.

In another design, the communication apparatus 700 is configured to perform actions performed by the access network device in the embodiment shown in FIG. 4, the transceiver unit 710 is configured to perform S402 and S404, and the processing unit 720 is configured to perform S403.

In an example, the communication apparatus 700 is configured to perform actions performed by the core network device in the embodiment shown in FIG. 4, the transceiver unit 710 is configured to perform S402, and the processing unit 720 is configured to perform S401.

In still another example, the communication apparatus 700 is configured to perform actions performed by the access network device in the embodiment shown in FIG. 5, the transceiver unit 710 is configured to perform S501 and S503, and the processing unit 720 is configured to perform S502.

In still another example, the communication apparatus 700 is configured to perform actions performed by the access network device in the embodiment shown in FIG. 6A and FIG. 6B, the transceiver unit 710 is configured to perform S601, S603, S605 to S607, S609 to S613, S615 to S617, and S619, and the processing unit 720 is configured to perform S604, S614, and S618.

In still another example, the communication apparatus 700 is configured to perform actions performed by the core network device in the embodiment shown in FIG. 6A and FIG. 6B, the transceiver unit 710 is configured to perform S601, S603, S607, S609, S612, and S613, and the processing unit 720 is configured to perform S602 and S608.

The communication apparatus 700 may implement steps or procedures performed by the access network device and the core network device in the method 400, the method 500, and the method 600 based on embodiments of this application. The communication apparatus 700 may include units configured to perform methods performed by the access network device and the core network device in the method 400 in FIG. 4, the method 500 in FIG. 5, and the method 600 in FIG. 6A and FIG. 6B. In addition, the units in the communication apparatus 700 and the foregoing other operations and/or functions are separately used to implement corresponding procedures of the method 400 in FIG. 4, the method 500 in FIG. 5, and the method 600 in FIG. 6A and FIG. 6B.

When the communication apparatus 700 is used as the access network device and is configured to perform the method 400 in FIG. 4, the transceiver unit 710 may be configured to perform steps 402 and 404 in the method 400, and the processing unit 720 may be configured to perform step 403 in the method 400.

When the communication apparatus 700 is used as the core network device and is configured to perform the method 400 in FIG. 4, the transceiver unit 710 may be configured to perform step 402 in the method 400, and the processing unit 720 may be configured to perform step 401 in the method 400.

When the communication apparatus 700 is used as the access network device and is configured to perform the method 500 in FIG. 5, the transceiver unit 710 may be configured to perform steps 501 and 503 in the method 500, and the processing unit 720 may be configured to perform step 502 in the method 500.

When the communication apparatus 700 is used as the access network device and is configured to perform the method 600 in FIG. 6A and FIG. 6B, the transceiver unit 710 may be configured to perform steps 601, 603, 605 to 607, 609 to 613, 614, 615 to 617, and 619 in the method 600, and the processing unit 720 may be configured to perform steps 604, 614, and 618 in the method 600.

When the communication apparatus 700 is used as the core network device and is configured to perform the method 600 in FIG. 6A and FIG. 6B, the transceiver unit 710 may be configured to perform steps 601, 603, 607, 609, 612, and 613 in the method 600, and the processing unit 720 may be configured to perform steps 602 and 608 in the method 600.

The processing unit 720 in the foregoing embodiment may be implemented by at least one processor or a processor-related circuit. The transceiver unit 710 may be implemented by a transceiver or a transceiver-related circuit. The transceiver unit 710 may also be referred to as a communication unit or a communication interface. The storage unit may be implemented by at least one memory.

Figure 8:
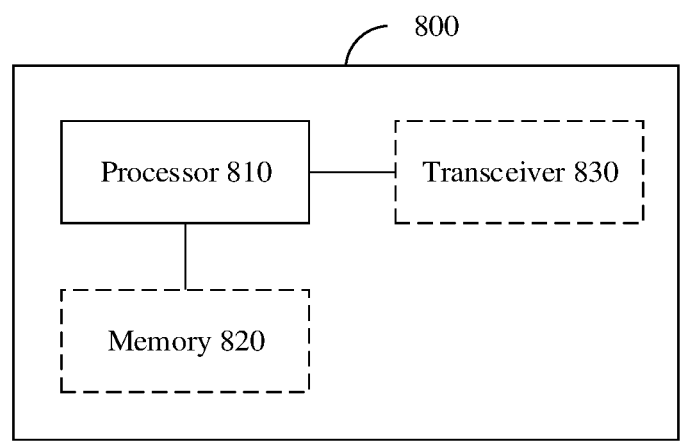
FIG. 8 is a schematic diagram of an architecture of a communication apparatus 800 applicable to an embodiment of this application.

As shown in FIG. 8, an embodiment of this application further provides a communication apparatus 800. The communication apparatus 800 includes a processor 810. The processor 810 is coupled to a memory 820. The memory 820 is configured to store a computer program or instructions and/or data. The processor 810 is configured to execute the computer program or the instructions and/or the data stored in the memory 820, so that the method in the foregoing method embodiments is performed.

Optionally, the communication apparatus 800 includes one or more processors 810.

Optionally, as shown in FIG. 8, the communication apparatus 800 may further include the memory 820.

Optionally, the communication apparatus 800 may include one or more memories 820.

Optionally, the memory 820 may be integrated with the processor 810, or separately disposed.

Optionally, as shown in FIG. 8, the communication apparatus 800 may further include a transceiver 830, and the transceiver 830 is configured to receive and/or send a signal. For example, the processor 810 is configured to control the transceiver 830 to receive and/or send a signal.

In a solution, the communication apparatus 800 is configured to perform operations performed by the terminal device in the foregoing method embodiments.

For example, the processor 810 is configured to perform processing-related operations performed by the terminal device in the foregoing method embodiments, and the transceiver 830 is configured to perform receiving/sending-related operations performed by the terminal device in the foregoing method embodiments.

In another solution, the communication apparatus 800 is configured to implement operations performed by the core network device or the access network device in the foregoing method embodiments.

For example, the processor 810 is configured to implement processing-related operations performed by the core network device or the access network device in the foregoing method embodiments, and the transceiver 830 is configured to implement transceiver-related operations performed by the core network device or the access network device in the foregoing method embodiments.

An embodiment of this application further provides a communication apparatus 900. The communication apparatus 900 may be a terminal device or a chip. The communication apparatus 900 may be configured to perform operations performed by the terminal device in the foregoing method embodiments.

Figure 9:
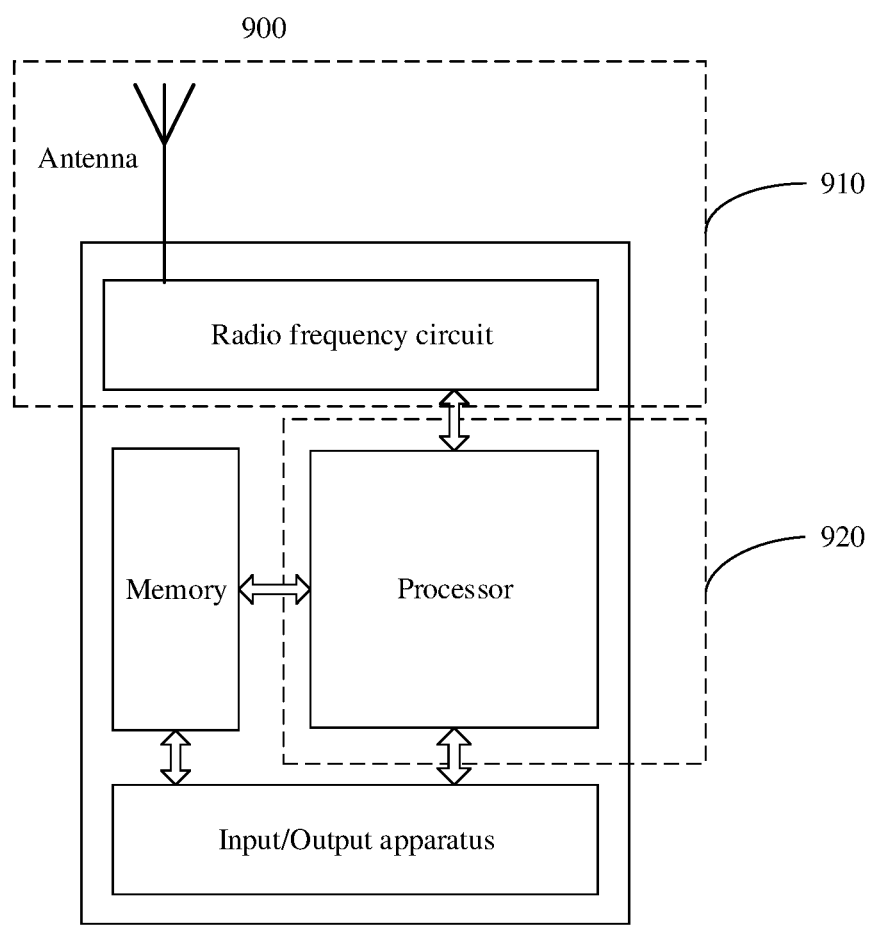
FIG. 9 is a schematic diagram of a structure of a communication apparatus 900 applicable to an embodiment of this application.

When the communication apparatus 900 is a terminal device, FIG. 9 is a simplified schematic diagram of a structure of the terminal device. As shown in FIG. 9, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store the software program and the data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display, or a keyboard, is mainly configured to: receive data input by a user and output data to the user. It should be noted that some types of terminal devices may have no input/output apparatus.

When needing to send data, after performing baseband processing on the to-be-sent data, the processor outputs a baseband signal to the radio frequency circuit; and the radio frequency circuit performs radio frequency processing on the baseband signal and then sends the radio frequency signal to the outside in a form of an electromagnetic wave through the antenna. When data needs to be sent to the terminal device, the radio frequency circuit receives the radio frequency signal through the antenna, converts the radio frequency signal into a baseband signal, and outputs the baseband signal to the processor. The processor converts the baseband signal into data, and processes the data. For ease of description, FIG. 9 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and a radio frequency circuit that have a transceiver function may be considered as a transceiver unit of the terminal device, and a processor that has a processing function may be considered as a processing unit of the terminal device.

As shown in FIG. 9, the terminal device includes a transceiver unit 910 and a processing unit 920. The transceiver unit 910 may also be referred to as a transceiver, a transceiver machine, a transceiver apparatus, or the like. The processing unit 920 may also be referred to as a processor, a processing board, a processing module, a processing apparatus, or the like.

Optionally, a component that is in the transceiver unit 910 and that is configured to implement a receiving function may be considered as a receiving unit, and a component that is in the transceiver unit 910 and that is configured to implement a sending function may be considered as a sending unit. In other words, the transceiver unit 910 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receive circuit, or the like. The sending unit sometimes may also be referred to as a transmitter machine, a transmitter, a transmit circuit, or the like.

For example, in an implementation, the processing unit 920 is configured to perform a processing action on a terminal device side. For example, the transceiver unit 910 is configured to perform a sending and receiving operation in step 404 in FIG. 4.

For another example, in an implementation, the transceiver unit 910 is configured to perform sending and receiving operations in steps 501 and 503 in FIG. 5.

For another example, in an implementation, the transceiver unit 910 is configured to perform sending and receiving operations in steps 601, 605, 606, and 610 in FIG. 6A.

For another example, in an implementation, the transceiver unit 910 is configured to perform sending and receiving operations in steps 601, 605, 611, 615, 617, and 619 in FIG. 6A and FIG. 6B.

It should be understood that FIG. 9 is merely an example instead of a limitation. The terminal device including the transceiver unit and the processing unit may not depend on the structure shown in FIG. 9.

When the communication apparatus 900 is a chip, the chip includes a transceiver unit and a processing unit. The transceiver unit may be an input/output circuit or a communication interface. The processing unit may be a processor, a microprocessor, or an integrated circuit that is integrated on the chip.

An embodiment of this application further provides a communication apparatus 1000. The communication apparatus 1000 may be an access network device or a core network device, or may be a chip. The communication apparatus 1000 may be configured to perform operations performed by the access network device or the core network device in the foregoing method embodiments.

Figure 10:
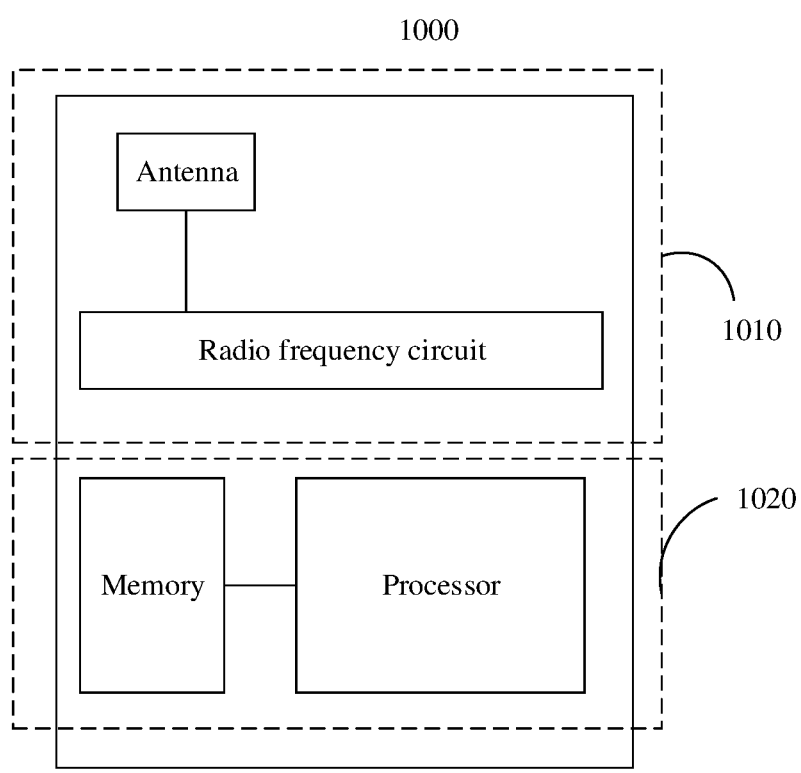
FIG. 10 is a schematic diagram of an architecture of a communication apparatus 1000 applicable to an embodiment of this application.

When the communication apparatus 1000 is the access network device, for example, a base station, FIG. 10 is a simplified schematic diagram of a structure of the base station. The base station includes a part 1010 and a part 1020. The part 1010 is mainly configured to: send and receive a radio frequency signal, and perform conversion between the radio frequency signal and a baseband signal. The part 1020 is mainly configured to: perform baseband processing, control the base station, and the like. The part 1010 may usually be referred to as a transceiver unit, a transceiver machine, a transceiver circuit, a transceiver, or the like. The part 1020 is usually a control center of the base station, may usually be referred to as a processing unit, and is configured to control the base station to perform processing an operation on a network device side in the foregoing method embodiments.

The transceiver unit in the part 1010 may also be referred to as a transceiver machine, a transceiver, or the like. The transceiver unit includes an antenna and a radio frequency circuit, where the radio frequency circuit is mainly configured to perform radio frequency processing. Optionally, a component that is in the part 1010 and that is configured to implement a receiving function may be considered as a receiving unit, and a component that is in the part 1010 and that is configured to implement a sending function may be considered as a sending unit. In other words, the part 1010 includes the receiving unit and the sending unit. The receiving unit may also be referred to as a receiving machine, a receiver, a receiving circuit, or the like. The sending unit may be referred to as a transmitter machine, a transmitter, a transmitting circuit, or the like.

The part 1020 may include one or more boards, and each board may include one or more processors and one or more memories. The processor is configured to read and execute a program in the memory, to implement a baseband processing function and control the base station. If there are a plurality of boards, the boards may be interconnected with each other, to enhance a processing capability. In an optional implementation, a plurality of boards may share one or more processors, a plurality of boards may share one or more memories, or a plurality of boards may simultaneously share one or more processors.

For example, in an implementation, the transceiver unit in the part 1010 is configured to perform transceiver-related steps performed by the access network device in the embodiment shown in FIG. 4. The part 1020 is configured to perform processing-related steps performed by the access network device in the embodiment shown in FIG. 4.

For example, in still another implementation, the transceiver unit in the part 1010 is configured to perform transceiver-related steps performed by the access network device in the embodiment shown in FIG. 5. The part 1020 is configured to perform processing-related steps performed by the access network device in the embodiment shown in FIG. 5.

For example, in still another implementation, the transceiver unit in the part 1010 is configured to perform transceiver-related steps performed by the access network device in the embodiment shown in FIG. 6A and FIG. 6B. The part 1020 is configured to perform processing-related steps performed by the access network device in the embodiment shown in FIG. 6A and FIG. 6B.

It should be understood that FIG. 10 is merely an example instead of a limitation. The network device including the transceiver unit and the processing unit may not depend on the structure shown in FIG. 10.

When the communication apparatus 1000 is a chip, the chip includes a transceiver unit and a processing unit. The transceiver unit may be an input/output circuit or a communication interface. The processing unit is a processor, a microprocessor, or an integrated circuit integrated on the chip.

An embodiment of this application further provides a computer-readable storage medium. The computer-readable storage medium stores computer instructions used to implement the method performed by the terminal device or the method performed by the network device in the foregoing method embodiments.

For example, when a computer program is executed by a computer, the computer is enabled to implement the method performed by the terminal device or the method performed by the network device in the foregoing method embodiments.

An embodiment of this application further provides a computer program product including instructions. When the instructions are executed by a computer, the computer is enabled to implement the method performed by the terminal device or the method performed by the network device in the foregoing method embodiments.

An embodiment of this application further provides a communication system. The communication system includes the network device and the terminal device in the foregoing embodiments.

It may be clearly understood by a person skilled in the art that, for convenience and brief description, for explanations and advantageous effects of related content in any communication apparatus provided above, refer to the corresponding method embodiment provided above. Details are not described herein again.

In embodiments of this application, the terminal device or the network device may include a hardware layer, an operating system layer running above the hardware layer, and an application layer running above the operating system layer. The hardware layer may include hardware such as a central processing unit (CPU), a memory management unit (MMU), and a memory (also referred to as a primary memory). An operating system at the operating system layer may be any one or more computer operating systems that implement service processing through a process (process), for example, a Linux operating system, a Unix operating system, an Android operating system, an iOS operating system, or a Windows operating system. The application layer may include applications such as a browser, an address book, word processing software, and instant communication software.

A specific structure of an execution body of the method provided in embodiments of this application is not specifically limited in embodiments of this application, provided that a program that records code of the method provided in embodiments of this application can be run to perform communication according to the method provided in embodiments of this application. For example, the method provided in embodiments of this application may be performed by a terminal device, a network device, or a functional module that is in a terminal device or a network device and that can invoke and execute the program.

Aspects or features of this application may be implemented as a method, an apparatus or a product that uses standard programming and/or engineering technologies. The term "product" used in this specification may cover a computer program that can be accessed from any computer-readable component, carrier, or medium.

The computer-readable storage medium may be any usable medium accessible by a computer, or a data storage device, such as a server or a data center, integrating one or more usable media. The usable medium (or the computer-readable medium) may include, for example, but is not limited to, various media that can store program code such as a magnetic medium or a magnetic storage device (for example, a floppy disk, a hard disk (for example, a removable hard disk), or a magnetic tape), an optical medium (for example, an optical disc, a compact disc (CD), or a digital versatile disc (DVD)), a smart card, and a flash memory device (for example, an erasable programmable read-only memory (EPROM), a card, a stick, or a key drive), or a semiconductor medium (for example, a solid state disk (SSD), a USB flash drive, a read-only memory (ROM), or a random access memory (RAM)).

Various storage media described in this specification may indicate one or more devices and/or other machine-readable media that are configured to store information. The term "machine-readable media" may include but is not limited to a radio channel and various other media that can store, include, and/or carry instructions and/or data.

It should be understood that the processor in embodiments of this application may be a central processing unit (CPU), another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

It may be understood that the memory mentioned in embodiments of this application may be a volatile memory or a non-volatile memory, or may include a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM). For example, the RAM may be used as an external cache. As an example instead of a limitation, the RAM may include the following plurality of forms: a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be noted that when the processor is a general-purpose processor, a DSP, an ASIC, an FPGA or another programmable logic device, a discrete gate or transistor logic device, or a discrete hardware component, the memory (storage module) may be integrated into the processor.

It should further be noted that the memory described in this specification aims to include but is not limited to these memories and any memory of another proper type.

In the several embodiments provided in this application, it should be understood that the disclosed apparatus and method may be implemented in other manners. For example, the foregoing apparatus embodiments are only examples. For example, division into the foregoing units is only logical function division, and may be another division manner during actual implementation. For example, a plurality of units or components may be combined or integrated into another system, or some features may be ignored or not performed. In addition, the displayed or discussed mutual couplings, direct couplings, or communication connections may be implemented through some interfaces. Indirect couplings or communication connections between the apparatuses or units may be implemented in an electronic form, a mechanical form, or another form.

The foregoing units described as separate parts may or may not be physically separate, and parts displayed as units may or may not be physical units, may be located in one position, or may be distributed on a plurality of network units. Some or all of the units may be selected based on actual requirements to implement the solutions provided in this application.

In addition, function units in embodiments of this application may be integrated into one unit, each of the units may exist alone physically, or two or more units are integrated into one unit.

All or some of the foregoing embodiments may be implemented by using software, hardware, firmware, or any combination thereof.

When software is used to implement the embodiments, all or a part of the embodiments may be implemented in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or other programmable apparatuses. For example, the computer may be a personal computer, a server, or a network device. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. For the computer-readable storage medium, refer to the foregoing descriptions.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   receiving first information, wherein the first information comprises service identifier information of a multicast service, first parameter information, and second parameter information, the first parameter information comprises at least one of a paging index value of at least one terminal device in a first set of terminal devices or discontinuous reception cycle information of at least one terminal device in the first set of terminal devices, and the first set of terminal devices comprises at least two terminal devices, the second parameter information comprises a common tracking area identity list (TAI list) of each terminal device in a second set of terminal devices, the second set of terminal devices comprises at least one terminal device, and the second set of terminal devices belongs to the first set of terminal devices;

determining a sending time of second information based on the first information, wherein the second information comprises the service identifier information of the multicast service; and sending the second information to a first terminal device at the sending time of the second information, wherein the first terminal device belongs to the first set of terminal devices.

2. The method according to claim 1, wherein each paging index value is calculated based on a non-access stratum identifier of the corresponding terminal device.

3. The method according to claim 2, wherein each paging index value is a non-access stratum identifier of the corresponding terminal device mod 1024.

4. The method according to claim 1, wherein each terminal device in the first set of terminal devices has joined a first multicast group, is in a radio resource control (RRC) idle state, and is capable of receiving the multicast service.

5. The method according to claim 1, wherein the second parameter information is information of common parts of all terminal devices in the second set of terminal devices.

6. The method according to claim 1, wherein the second information is sent to all terminal devices in the second set of terminal devices.

7. The method according to claim 1, wherein when paging index values and tracking area identity list information of the at least two terminal devices in the first set of terminal devices are the same, the first parameter information carries a paging index value of one terminal device in the at least two terminal devices in the first set of terminal devices.

8. The method according to claim 1, wherein when paging index values, discontinuous reception cycle information, and tracking area identity list information of the at least two terminal devices in the first set of terminal devices are the same, the first parameter information carries a paging index value and discontinuous reception cycle information of one terminal device in the at least two terminal devices in the first set of terminal devices.

9. A method, comprising:
determining first information, wherein the first information comprises service identifier information of a multicast service, first parameter information, and second parameter information, the first parameter information comprises at least one of a paging index value of at least one terminal device in a first set of terminal devices or discontinuous reception cycle information of at least one terminal device in the first set of terminal devices, the first set of terminal devices comprises at least two terminal devices, the second parameter information comprises a common tracking area identity list (TAI list) of each terminal device in a second set of terminal devices, the second set of terminal devices comprises at least one terminal device, and the second set of terminal devices belongs to the first set of terminal devices, the first information is configured to be used for determining a sending time of second information, and the second information comprises the service identifier information of the multicast service; and sending the first information to an access network device.

10. The method according to claim 9, wherein each paging index value is calculated based on a non-access stratum identifier of the corresponding terminal device.

11. The method according to claim 10, wherein each paging index value is a non-access stratum identifier of the corresponding terminal device mod 1024.

12. The method according to claim 9, wherein the second parameter information is information of common parts of all terminal devices in the second set of terminal devices.

13. The method according to claim 9, wherein each terminal device in the first set of terminal devices has joined a first multicast group, is in a radio resource control (RRC) idle state, and is capable of receiving the multicast service.

14. The method according to claim 9, wherein when paging index values and tracking area identity list information of the at least two terminal devices in the first set of terminal devices are the same, the first parameter information carries a paging index value of one terminal device in the at least two terminal devices.

15. The method according to claim 9, wherein when paging index values, discontinuous reception cycle information, and tracking area identity list information of the at least two terminal devices in the first set of terminal devices are the same, the first parameter information carries a paging index value and discontinuous reception cycle information of one terminal device in the at least two terminal devices.

16. An apparatus, comprising:
one or more processors configured to:
receive first information, wherein the first information comprises service identifier information of a multicast service, first parameter information, and second parameter information, the first parameter information comprises at least one of a paging index value of at least one terminal device in a first set of terminal devices or discontinuous reception cycle information of at least one terminal device in the first set of terminal devices, and the first set of terminal devices comprises at least two terminal devices, the second parameter information comprises a common tracking area identity list (TAI list) of each terminal device in a second set of terminal devices, the second set of terminal devices comprises at least one terminal device, and the second set of terminal devices belongs to the first set of terminal devices;

determine a sending time of second information based on the first information, wherein the second information comprises the service identifier information of the multicast service; and send the second information to a first terminal device at the sending time of the second information, wherein the first terminal device belongs to the first set of terminal devices.

17. The apparatus according to claim 16, wherein each paging index value is a non-access stratum identifier of the corresponding terminal device mod 1024.

18. The apparatus according to claim 16, wherein each terminal device in the first set of terminal devices has joined a first multicast group, is in a radio resource control (RRC) idle state, and is capable of receiving the multicast service.

19. The apparatus according to claim 16, wherein the second parameter information is information of common parts of all terminal devices in the second set of terminal devices.

20. The apparatus according to claim 16, wherein when paging index values and tracking area identity list information of the at least two terminal devices in the first set of terminal devices are the same, the first parameter information carries a paging index value of one terminal device in the at least two terminal devices.

21. An apparatus, comprising:
one or more processors configured to:
determine first information, wherein the first information comprises service identifier information of a multicast service, first parameter information, and second parameter information, the first parameter information comprises at least one of a paging index value of at least one terminal device in a first set of terminal devices or discontinuous reception cycle information of at least one terminal device in the first set of terminal devices, the first set of terminal devices comprises at least two terminal devices, the second parameter information comprises a common tracking area identity list (TAI list) of each terminal device in a second set of terminal devices, the second set of terminal devices comprises at least one terminal device, and the second set of terminal devices belongs to the first set of terminal devices, the first information is configured to be used for determining sending time of second information, and the second information comprises the service identifier information of the multicast service; and
send the first information to an access network device.

22. The apparatus according to claim 21, wherein each paging index value is a non-access stratum identifier of the corresponding terminal device mod 1024.

23. The apparatus according to claim 21, wherein the second parameter information is information of common parts of all terminal devices in the second set of terminal devices.

24. The apparatus according to claim 21, wherein when paging index values and tracking area identity list information of the at least two terminal devices in the first set of terminal devices are the same, the first parameter information carries a paging index value of one terminal device in the at least two terminal devices.

* * * * *